(12) United States Patent
Tanaka et al.

(10) Patent No.: US 7,236,441 B2
(45) Date of Patent: Jun. 26, 2007

(54) RECORDING DEVICE, REPRODUCTION DEVICE, AND RECORDING/REPRODUCTION DEVICE

(75) Inventors: Satoru Tanaka, Saitama (JP); Yoshihisa Itoh, Saitama (JP); Akihiro Tachibana, Saitama (JP); Yoshihisa Kubota, Saitama (JP)

(73) Assignee: Pioneer Corporation, Tokyo (JP)

( * ) Notice: Subject to any disclaimer, the term of this patent is extended or adjusted under 35 U.S.C. 154(b) by 42 days.

(21) Appl. No.: 10/522,916

(22) PCT Filed: Jul. 29, 2003

(86) PCT No.: PCT/JP03/09600

§ 371 (c)(1),
(2), (4) Date: Jan. 31, 2005

(87) PCT Pub. No.: WO2004/012016

PCT Pub. Date: Feb. 5, 2004

(65) Prior Publication Data
US 2005/0249095 A1  Nov. 10, 2005

(30) Foreign Application Priority Data
Jul. 31, 2002  (JP) .............................. 2002-223465

(51) Int. Cl.
*G11B 7/00* (2006.01)

(52) U.S. Cl. ....................................... 369/103; 369/117

(58) Field of Classification Search .................... None
See application file for complete search history.

(56) References Cited

U.S. PATENT DOCUMENTS

| 3,697,149 | A | * | 10/1972 | Van Heeckeren et al. | .. 369/103 |
| 3,865,996 | A | * | 2/1975 | Kato | ........................... 369/103 |
| 2001/0017836 | A1 | * | 8/2001 | Itoh et al. | ................... 369/103 |

FOREIGN PATENT DOCUMENTS

| EP | 0 945 870 A2 | 9/1999 |
| JP | 11-317084 | 11/1999 |
| JP | 2002-123949 | 4/2002 |

* cited by examiner

*Primary Examiner*—William Korzuch
*Assistant Examiner*—Christopher Lamb
(74) *Attorney, Agent, or Firm*—Nixon & Vanderhye, PC

(57) ABSTRACT

An example recording apparatus includes a pulse oscillation laser, a half mirror for splitting the pulse oscillation light of the laser into a signal light and a reference light, an optical shutter disposed in the optical path of the signal light, a beam expander for converting the signal light into a light beam of a predetermined diameter, a spatial modulator for modulating the recording data into two-dimensional image information, a Fourier Transform lens for introducing the signal light modulated by the spatial modulator onto a recording medium, mirrors for introducing the reference light onto the recording medium with a predetermined angle, a system control unit, a laser driver, a system controller, a recording medium drive mechanism, a modulator driver, a data input unit, and a data processing unit.

24 Claims, 12 Drawing Sheets

IF NO MOVEMENT, MIN/MAX POSITIONS OF INTENSITY ARE FIXED

IF ANY MOVEMENT, MIN/MAX POSITIONS OF INTENSITY CHANGE

RECORDING DEVICE, REPRODUCTION DEVICE, AND RECORDING/REPRODUCTION DEVICE

This application is the US national phase of international application PCT/JP03/09600 filed 29 Jul. 2003 which designated the U.S. and claims benefit of JP 2002-223465, dated 31 Jul. 2002, the entire contents of each of which are hereby incorporated by reference.

TECHNICAL FIELD

The present invention relates to a recording apparatus, a reproduction apparatus and a recording reproduction apparatus for recording data in a recording medium and reproducing the data, such as a hologram recording apparatus, a hologram reproduction apparatus and a hologram recording reproduction apparatus for recording data in a hologram recording medium and reproducing the data.

BACKGROUND ART

Recently, a recording medium capable of recording a three-dimensional interference pattern as a spatial change of the refractive index in the inside thereof receives attention. For example, a photorefractive crystal receives attention, which is a photosensitive medium such as lithium niobate ($NbO_3$, abbreviated to LN). The photorefractive effect is a phenomenon in which a movement of electric charge generated by photoexcitation in the medium forms a spatial electric field, and then, the spatial electric field produces linear electrooptic effect, i.e. Pockels effect, and then, this effect produces a change of a refractive index of a medium.

In ferroelectric crystal and the like showing the photorefractive effect, the change of the refractive index responds to a fine light input pattern typically more than 1000 lines per 1 mm, and the change of the refractive index is produced in real time with a response speed of micro second order to second order in some materials. For this reason, various applications are studied with respect to the use of the ferroelectric crystal and the like as a real-time hologram recording medium capable of eliminating the necessity of a development process.

One of the various applications is a hologram memory. This hologram memory has the following features. Digital data is converted into a two-dimensional light-and-dark dot pattern image on a panel plane of a transmission type liquid crystal device for example, by using a spatial light on-off signal. Then, interference between a signal light passing through this image data and a coherent reference light is brought about. Then, the interference pattern corresponding to the dot pattern image is recorded in the recording medium. On the other hand, in reproduction, the recording medium in which the interference pattern is recorded is irradiated with a light identical with the reference light. Then, the resulting dot pattern image is received by a photodetector. Then, processing is performed on an output signal of the photodetector by using an electric circuit in order to reproduce the digital data. Then, the reproduced digital signal is read. For example, Japanese Patent Application Laid-Open No. Hei 11-282330 discloses an example of a hologram memory technology.

DISCLOSURE OF INVENTION

However, in the case that data is continuously recorded in a situation that a position of the recording medium changes relative to positions of the signal light and the reference light, the interference pattern produced by the two-dimensional image corresponding to the recording data and the reference light is recorded while moving in the recording medium. Therefore, the interference fringes are recorded with the small amplitude. Also in the case that the data is continuously reproduced, the two-dimensional image generated from the interference fringes by the reference light moves on the photodetector. Therefore, the reproduction signal level becomes low and the S/N ratio is deteriorated.

Therefore, the present invention has been accomplished to solve the above problem, for example. The present invention aims to provide a recording apparatus for recording interference fringes corresponding to recording data with a large amplitude, even if a position of a recording medium such as a hologram recording medium moves relative to positions of a signal light and a reference light. The present invention further aims to provide a reproduction apparatus for reproducing the data from the interference fringes having a large amplitude with a good S/N ratio being maintained, even if a position of the recording medium moves relative to a position of the reference light. The present invention further aims to provide a recording and reproduction apparatus having these recording and reproducing functions, even if a position of the recording medium moves relative to positions of the signal light and the reference light.

The first recording apparatus according to the present invention is a recording apparatus for recording a light interference pattern of at least two coherent lights into a recording medium as a spatial change of a refractive index, the apparatus provided with: a pulse oscillation laser for generating coherent light; a signal light optical system for introducing coherent signal light based on the coherent light to the recording medium via a Fourier Transform lens; a reference light optical system for introducing coherent reference light based on the coherent light to the recording medium; a spatially modulating device disposed in the signal light optical system; and a pulse oscillation controlling device for controlling a oscillation timing of the laser.

According to the first recording apparatus of the present invention, the coherent signal light and the coherent reference light interferences with each other in the photosensitive medium, for example a recording medium made of a photorefractive crystal such as lithium niobate (LN), so that the interference pattern is recorded as a spatial change of the refractive index. Light beams obtained by splitting the light beam from the pulse oscillation laser, such as a semiconductor laser, are used as the signal light and the reference light, respectively. Furthermore, the light beams may be attenuated with a filter so as to adjust each light power to a predetermined light power. The signal light is converted by the spatially modulating device disposed in the signal light optical system into a signal corresponding to recording data. That is, the spatially modulating device uses an image displaying device having light transmittance property or light reflective property, for example. The spatially modulating device performs the conversion by displaying the recording data as a two-dimensional dot pattern. The signal light modulated according to this two-dimensional dot pattern interferences with the reference light in the recording medium, so that the interference fringes are recorded in correspondence with the data.

One of features of the first recording apparatus according to the present invention is that the pulse oscillation laser of high oscillation power is used as a light source, and the pulse oscillation timing of this laser is controlled by the pulse oscillation controlling device, and this control can be also performed under an external device. Thereby, the interference fringes, which form a hologram for example, can be generated with high power for a short time, so that the high quality data recording with the large amplitude modulation can be achieved. Due to this effect, the interference pattern with a large amplitude modulation can be generated, even in the case that the recording medium moves relative to the signal light and the reference light. Therefore, the high quality data recording can be performed on a rotating disk-shaped recording medium for example. This is suitable for recording the continuous information such as music or video.

The second recording apparatus according to the present invention is a recording apparatus for recording a light interference pattern of at least two coherent lights into a recording medium as a spatial change of a refractive index, the apparatus provided with: a continuous oscillation laser for generating coherent light; a signal light optical system for introducing coherent signal light based on the coherent light to the recording medium via a Fourier Transform lens; a reference light optical system for introducing coherent reference light based on the coherent light to the recording medium; a spatially modulating device disposed in the signal light optical system; an optical shutting device disposed in the signal light optical system for selectively passing or obstructing the signal light; and an optical shutter controlling device for controlling an open time and an open timing of the optical shutting device.

According to the second recording apparatus of the present invention, the continuous oscillation laser, for example a semiconductor laser, is used as a light source. Furthermore, the optical shutter for controlling of passing or obstructing the light beam output form the laser is disposed in the signal light optical system. The optical shutter controlling device for controlling the optical shutter, for example controlling an open time and an open timing is also disposed in the signal light optical system. The light beam of the continuous oscillation laser is used as a signal light and a reference light. The signal light interferes with the reference light in the recording medium, and the resulting interference fringes are recorded as data.

One of features of the second recording apparatus according to the present invention is that the continuous oscillation laser is used as the light source, and the signal light beam of this laser, specifically, an irradiation time, timing and so on of the signal light beam onto the recording medium, are controlled by the optical shutter controlling device, and these controls can be also performed under an external device. Since the irradiation time of the light of high power sufficient to generate interference fringes, which form a hologram for example, the data recording with a large amplitude modulation can be achieved. In particular, by using the continuous oscillation laser of high light energy, the interference pattern with a large amplitude modulation can be generated, even in the case that the recording medium moves relative to the signal light and the reference light. Therefore, the high quality data recording can be performed on a rotating disk-shaped recording medium for example. This is suitable for recording the continuous information such as music or video. Furthermore, the use of the continuous oscillation laser improves handling of the light source. For example, a circuit related to the light source can be simplified.

In one aspect of each of the first and second recording apparatuses according to the present invention, the recording apparatus further includes a moving device for changing a position of the recording medium relative to positions of the signal light and the reference light.

According to this aspect, the moving device for moving the recording medium, if the medium is disk-shaped, may be a spindle motor for rotating the disk-shaped medium, or may be a slider for moving the disk-shaped medium in its radius direction. On the other hand, if the medium is card-shaped, the moving device may be a slider for moving the card-shaped medium straightly in X-Y direction. Alternatively, the optical system may be moved relative to the recording medium, instead of moving the recording medium. The use of such a moving device is suitable for recording continuous information such as music or video.

In another aspect of each of the first and second recording apparatuses according to the present invention, the spatially modulating device is one of a phase modulating device and an amplitude modulating device. For example, a liquid crystal device may be used.

According to this aspect, the spatially modulating device converts the recording data into the two-dimensional image information formed by a dot pattern. The spatially modulating device needs to have selective light transmittance property, a high speed data display ability and a high speed data exchange ability. The liquid crystal device may be suitably used as the spatially modulating device.

In another aspect of the second recording apparatus according to the present invention, the optical shutting device is one of a phase modulating device and an amplitude modulating device. For example, a liquid crystal device may be used.

In this aspect, high speed ON/OFF switching and high ratio of transmission and non-transmission are required for the optical shutting device. Therefore, the liquid crystal device may be suitably used.

In another aspect of the first recording apparatus according to the present invention, the pulse oscillation controlling device controls a pulse width of the laser.

According to this aspect, the pulse width of the laser light can be changed depending on the recording condition, so that the amplitude of the recorded interference pattern can be maintained above a certain level.

The first reproduction apparatus according to the present invention is a reproduction apparatus for reproducing information on the basis of a light interference pattern of at least two coherent lights recorded in the recording medium as a spatial change of a refractive index, the apparatus provided with: a pulse oscillation laser for generating coherent light; a reference light optical system for introducing coherent reference light based on the coherent light to the recording medium; a photodetecting device for receiving diffraction light based on the reference light from the recording medium via an inverse Fourier Transform lens; and a pulse oscillation controlling device for controlling an oscillation timing of the laser.

According to the first reproduction apparatus of the present invention, the coherent reference light is introduced onto interference fringes, which form a hologram for example, generated in the recording medium, specifically a photorefractive recording medium such as lithium niobate (LN), so that the data recorded as the spatial change of the refractive index is reproduced as the diffraction light. The diffraction light is collected onto the photodetecting device via the inverse Fourier transform lens and detected as two-dimensional image data. The pulse oscillation laser, specifically a semiconductor laser, is used as a light source for the reference light, and the oscillation timing of the pulse oscillation is controlled by the pulse oscillation controlling device.

One of features of the first reproduction apparatus according to the present invention is that the pulse oscillation laser of high oscillation power is used as the light source, and the pulse oscillation timing of this laser is controlled by the pulse oscillation controlling device, and this control can be also performed under an external device. Thereby, the interference fringes, which form a hologram for example, can be reproduced with high power for a short time, so that the high quality data reproduction with a large amplitude modulation can be achieved. Due to this effect, the reproduction signal with a large amplitude modulation can be reproduced, even in the case that the recording medium moves relative to the reference light. Therefore, the high quality data reproduction can be performed on a rotating disk-shaped recording medium for example. This is suitable for reproducing continuous information such as music or video.

The second reproduction apparatus according to the present invention is a reproduction apparatus for reproducing information on the basis of a light interference pattern of at least two coherent lights recorded in the recording medium as a spatial change of a refractive index, the apparatus provided with: a continuous oscillation laser for generating coherent light; a reference light optical system for introducing coherent reference light based on the coherent light to the recording medium; a photodetecting device for receiving diffraction light based on the reference light from the recording medium via an inverse Fourier Transform lens; an optical shutting device disposed in the reference light optical system for selectively passing or obstructing the reference light; and an optical shutter controlling device for controlling an open time and an open timing of the optical shutting device.

According to the second reproduction apparatus of the present invention, the coherent reference light is introduced onto interference fringes, which form a hologram for example, generated in the recording medium, so that the data recorded as a spatial change of the refractive index is reproduced as the diffraction light. The diffraction light is collected onto the photodetecting device via the inverse Fourier transform lens, and detected as two-dimensional image data. The continuous oscillation laser, specifically a semiconductor laser, is used as a light source for the reference light, and an irradiation time and timing onto the recording medium is controlled by opening or closing the optical shutting device under control of the optical shutter controlling device. That is, the reproduction apparatus according to the present invention is preferably a hologram reproduction apparatus for reproducing the information recorded as the interference fringes forming the light interference pattern, from a hologram recording medium.

One of features of the second reproduction apparatus according to the present invention is that the continuous oscillation laser is used as the light source, and the irradiation time and timing onto the recording medium is controlled by passing or obstructing the reference light by the optical shutting device, and this control can be also performed under an external device. The power of the reference light sufficient to perform the reproduction can be obtained for a short time. Thereby, even in the case that the recording medium moves relative to the reference light, the reproduction signal with a large amplitude modulation can be reproduced. Therefore, the high quality data reproduction can be performed on a rotating disk-shaped recording medium for example. This is suitable for reproducing continuous information such as music or video. Furthermore, the use of the continuous oscillation laser improves handling of the light source. For example, a circuit related to the light source can be simplified.

In one aspect of each of the first and second reproduction apparatuses according to the present invention, the apparatus further includes a moving device for changing a position of the recording medium relative to a position of the reference light.

According to this aspect, the moving device may be, for the disk-shaped medium for example, a spindle motor for rotating the disk or may be a slider for moving the disk in its radius direction. If the medium is card-shaped, the moving device may be a slider for straightly moving the card-shaped medium in X-Y direction. Alternatively, the optical system may be moved relative to the recording medium, instead of moving the recording medium. Using such a moving device is suitable for reproducing the information continuous in time such as music or video.

In another aspect of each of the first and second reproduction apparatuses according to the present invention, the photodetecting device is a CCD (Charge Coupled Device) device.

According to this aspect, the CCD device is used as the photodetecting device, and electronic charges stored during the irradiation time of the reference light are output as the reproduction signal, and the high level signal showing good S/N ratio is obtained.

In another aspect of each of the first and second reproduction apparatuses according to the present invention, the photodetecting device is a CMOS (Complementary Metal Oxide Semiconductor) device.

According to this aspect, the CMOS is used as the photodetecting device, and the signal is quickly output during the irradiation of the reference light. Therefore, it is suitable for the case that the recording medium moves relative to the reference light.

In another aspect of the second reproduction apparatus according to the present invention, the optical shutting device is one of a phase modulating device and an amplitude modulating device.

According to this aspect, high speed ON/OFF switching and high ratio of transmission and non-transmission are required for the optical shutting device. Therefore, a liquid crystal device may be suitably used.

In another aspect of the first reproduction apparatus according to the present invention, the pulse oscillation controlling device controls a pulse width of the laser.

According to this aspect, the pulse width of the laser light can be changed depending on the recording condition, so that the amplitude of the interference pattern to be recorded is maintained above a certain level.

The first recording reproduction apparatus according to the present invention is a recording reproduction apparatus for recording a light interference pattern of at least two coherent lights into a recording medium as a spatial change of a refractive index and reproducing the recorded pattern, the apparatus provided with: a pulse oscillation laser for generating coherent light; a signal light optical system for introducing coherent signal light based on the coherent light to the recording medium via a Fourier Transform lens; a reference light optical system for introducing coherent reference light based on the coherent light to the recording medium; a spatially modulating device disposed in the signal light optical system; a photodetecting device for receiving diffraction light based on the reference light from the recording medium via an inverse Fourier Transform lens;

and a pulse oscillation controlling device for controlling an oscillation timing of the laser. That is, the recording reproduction apparatus according to the present invention is preferably a hologram recording reproduction apparatus for recording information as interference fringes forming the light interference pattern, into a hologram recording medium, and reproducing the information recorded as the interference fringes forming a light interference pattern, from this hologram recording medium.

According to the first recording reproduction apparatus of the present invention, the coherent signal light interferences with the coherent reference light in the recording medium, specifically a photorefractive recording medium such as lithium niobate (LN), so that the interference pattern is recorded as a spatial change of the refractive index. Light beams obtained by splitting the light beam of the pulse oscillation laser, for example a semiconductor laser used as the signal light and the reference light. The light beams may be attenuated with a filter so as to adjust each light power to a predetermined light power. The signal light is converted by the spatially modulating device disposed in the signal light optical system into a signal corresponding to recording data. For example, a display device having light transmittance property or light reflectance property may be used as the spatially modulating device. In this case, the spatially modulating device displays the recording data as a two-dimensional dot pattern. The signal light modulated according to the two-dimensional dot pattern interferences with the reference light in the recording medium, and the resulting interference fringes are recorded as the data. On the other hand, for the reproduction, the coherent reference light is introduced onto the interference fringes, which form a hologram for example, generated in the recording medium, so that the data recorded as the spatial change of the refractive index is reproduced as the diffraction light. The diffraction light is collected onto the photodetecting device via the inverse Fourier transform lens and detected as two-dimensional image data. Incidentally, during the reproduction, the optical shutting device or the like prevents the signal light from entering the recording medium.

One of features of the first recording reproduction apparatus according to the present invention is that the pulse oscillation laser having high oscillation power is used as a light source, and the pulse oscillation timing of the laser is controlled by the pulse oscillation controlling device, and this control can be also performed under an external device. Thereby, the interference fringes, which form a hologram for example, can be generated or reproduced with high power for a short time, so that the high quality data recording and reproduction can be achieved with a large amplitude modulation. Due to this effect, the interference pattern with a large amplitude modulation can be generated, or the reproduction signal with a large amplitude modulation is reproduced, even in the case that the recording medium moves relative to the signal light and the reference light. Therefore, the high quality data recording and reproduction can be performed on a rotating disk-shaped recording medium for example. This is suitable for recording continuous information such as music or video.

The second recording reproduction apparatus according to the present invention is a recording reproduction apparatus for recording a light interference pattern of at least two coherent lights into a recording medium as a spatial change of a refractive index and reproducing the recorded pattern, the apparatus provided with: a continuous oscillation laser for generating coherent light; a signal light optical system for introducing coherent signal light based on the coherent light to the recording medium via a Fourier Transform lens; a reference light optical system for introducing coherent reference light based on the coherent light to the recording medium; a spatially modulating device disposed in the signal light optical system; a first optical shutting device disposed in the signal light optical system for selectively passing or obstructing the signal light; a second optical shutting device disposed in the reference light optical system for selectively passing or obstructing the reference light; an optical shutter controlling device for controlling an open time and an open timing of the first optical shutting device and the second optical shutting device; and a photodetecting device for receiving diffraction light based on the reference light from the recording medium via an inverse Fourier Transform lens. That is, the recording reproduction apparatus according to the present invention is preferably a hologram recording reproduction apparatus for recording information as interference fringes forming the light interference pattern, into a hologram recording medium, and reproducing the information recorded as the interference fringes forming the light interference pattern, from the hologram recording medium.

According to the second recording reproduction apparatus of the present invention, the continuous oscillation laser, specifically a semiconductor laser, is used as a light source. Light beams obtained by splitting the light beam of the continuous oscillation laser are used as the signal light and the reference light. The first optical shutter is disposed in the signal light optical system for controllably passing or reflecting the light beam of the laser. An irradiation time of the signal light is controlled by the optical shutter controlling device, which controls the open time and the open timing of the first optical shutter. On the other hand, for the reproduction, the reference light is introduced onto the interference fringes, which form a hologram for example, generated in the recording medium, so that the data recorded as a spatial change of the refractive index is reproduced as the diffraction light. The diffraction light is collected onto the photodetecting device via the inverse Fourier transform lens, and detected as two-dimensional data. The irradiation time and timing onto the recording medium is controlled by opening or closing the second optical shutting device disposed in the reference light optical system under control of the optical shutter controlling device. Incidentally, during the reproduction, the first optical shutter is closed to prevent the signal light from entering the recording medium.

One of features of the second recording reproduction apparatus according to the present invention is that the continuous oscillation laser is used as the light source, and the irradiation time and the timing of the signal light and the reference light are controlled by the optical shutter controlling device, and this control can be also performed under an external device. The irradiation time of the light beam having a power sufficient to generate the interference fringes, which form a hologram for example, can be controlled, so that the data recording is achieved with a large amplitude modulation and a good S/N ratio reproduction is achieved. Therefore, the high quality data recording and reproduction can be achieved even in the case that the recording medium moves relative to the signal light or the reference light during recording or reproduction. This is suitable for recording and reproduction the continuous information such as music or video. Furthermore, using the continuous oscillation laser improves handling of the light source. For example, a circuit related to the light source can be simplified.

In an aspect of each of the first and second recording reproduction apparatuses according to the present invention, the apparatus further includes a moving device for changing a position of the recording medium relative to positions of the signal light and the reference light.

According to this aspect, the moving device may be, for a disk-shaped medium, a spindle motor for rotating the disk-shaped medium, or may be a slider for moving the disk-shaped medium in its radius direction. If the medium is card-shaped, the moving device may be a slider for straightly moving the card-shaped medium in a X-Y plane. Alternatively, the optical system may be moved relative to the recording medium. Using such a moving device is suitable for recording and reproducing the information continuous in time such as music or video.

In another aspect of the first or second recording reproduction apparatus according to the present invention, the spatially modulating device is one of a phase modulating device and an amplitude modulating device. For example, a liquid crystal device may be used.

According to this aspect, the spatially modulating device modulates the recording data into two-dimensional image information formed by a dot pattern. For this, the light transmittance property and displaying or exchanging the data with high speed are required for the spatially modulating device. The liquid crystal device may be suitably used as the spatially modulating device.

In another aspect of the second recording reproduction apparatus according to the present invention, each of the first optical shutting device and the second optical shutting device is one of a phase modulating device and an amplitude modulating device. For example, a liquid crystal device may be used.

According to this aspect, high speed ON/OFF switching and high ratio of transmittion and non-transmission are required for the optical shutting device. Therefore, the liquid crystal device may be suitably used.

In another aspect of the first or second recording reproduction apparatus according to the present invention, the photodetecting device is a CCD device.

According to this aspect, the CCD device is used as the photodetecting device, and electric charge stored during the irradiation time of the reference light is output as the reproduction signal, so that the high level signal showing good S/N ratio can be obtained.

In another aspect of the first or second recording reproduction apparatus according to the present invention, the photodetecting device is a CMOS device.

According to this aspect, the CMOS device is used as the photodetecting apparatus, so that the signal during the irradiation of the reference light is output at high speed. Therefore, it is suitable in the case that the recording medium moves relative to the reference light.

In another aspect of the first recording reproduction apparatus according to the present invention, the pulse oscillation controlling device controls a pulse width of the laser.

According to this aspect, the pulse width can be changed depending on the recording condition, so that the amplitude of the interference pattern to be recorded is maintained above a certain level.

The above effects and other advantages of the present invention will be more apparent from the following explanation.

BRIEF DESCRIPTION OF DRAWINGS

FIG. 3 shows a signal light and a reference light incident along the same light axis for generating interference fringes.

FIG. 4 shows a signal light and a reference light incident with a predetermined angle between them for generating interference fringes.

FIG. 5 shows a condition of generation of interference fringes in the case that a position of a recording medium is changed relative to positions of a signal light and a reference light.

BEST MODE FOR CARRYING OUT THE INVENTION

EMBODIMENT OF RECORDING APPARATUS

Figure 1:
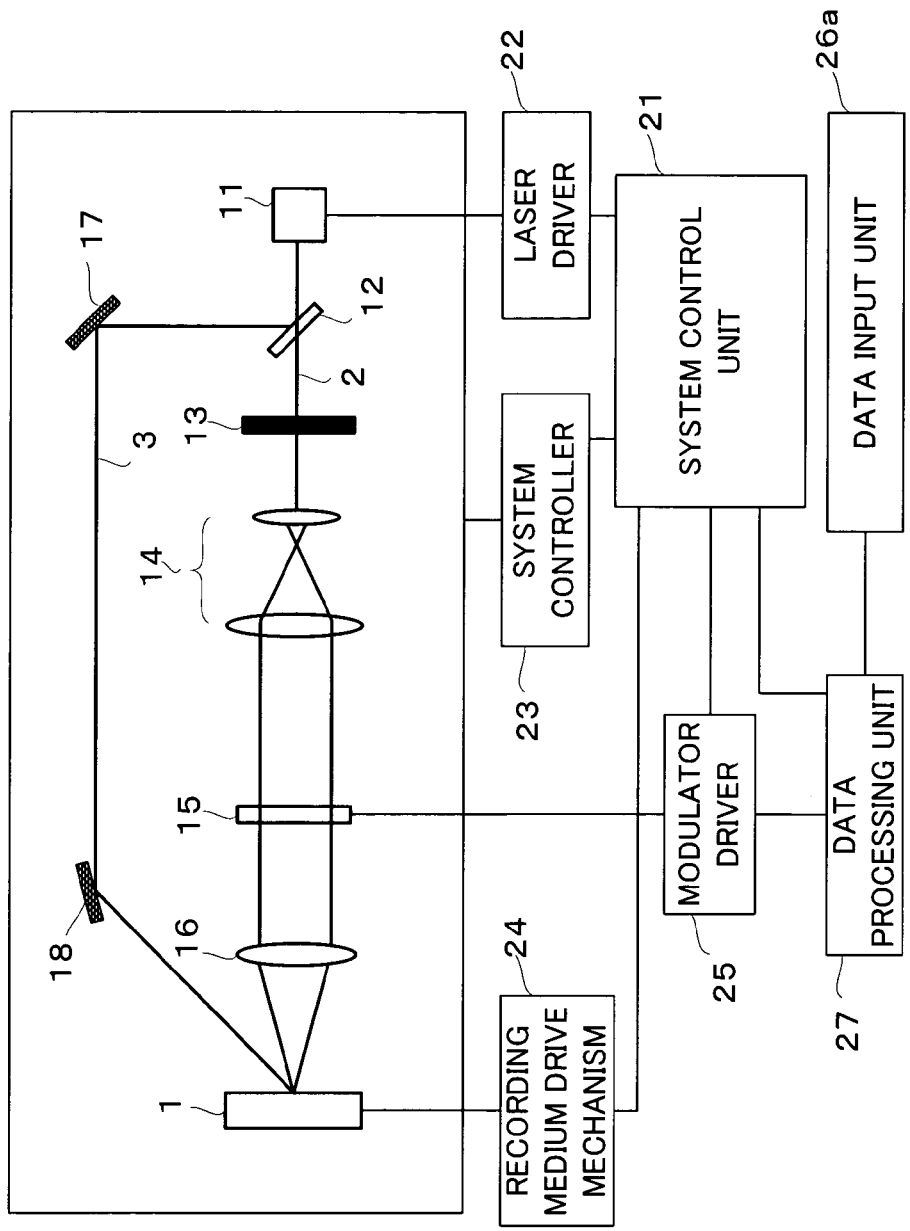
FIG. 1 is a view showing a construction of an embodiment of the recording apparatus according to the present invention.
Figure 2:
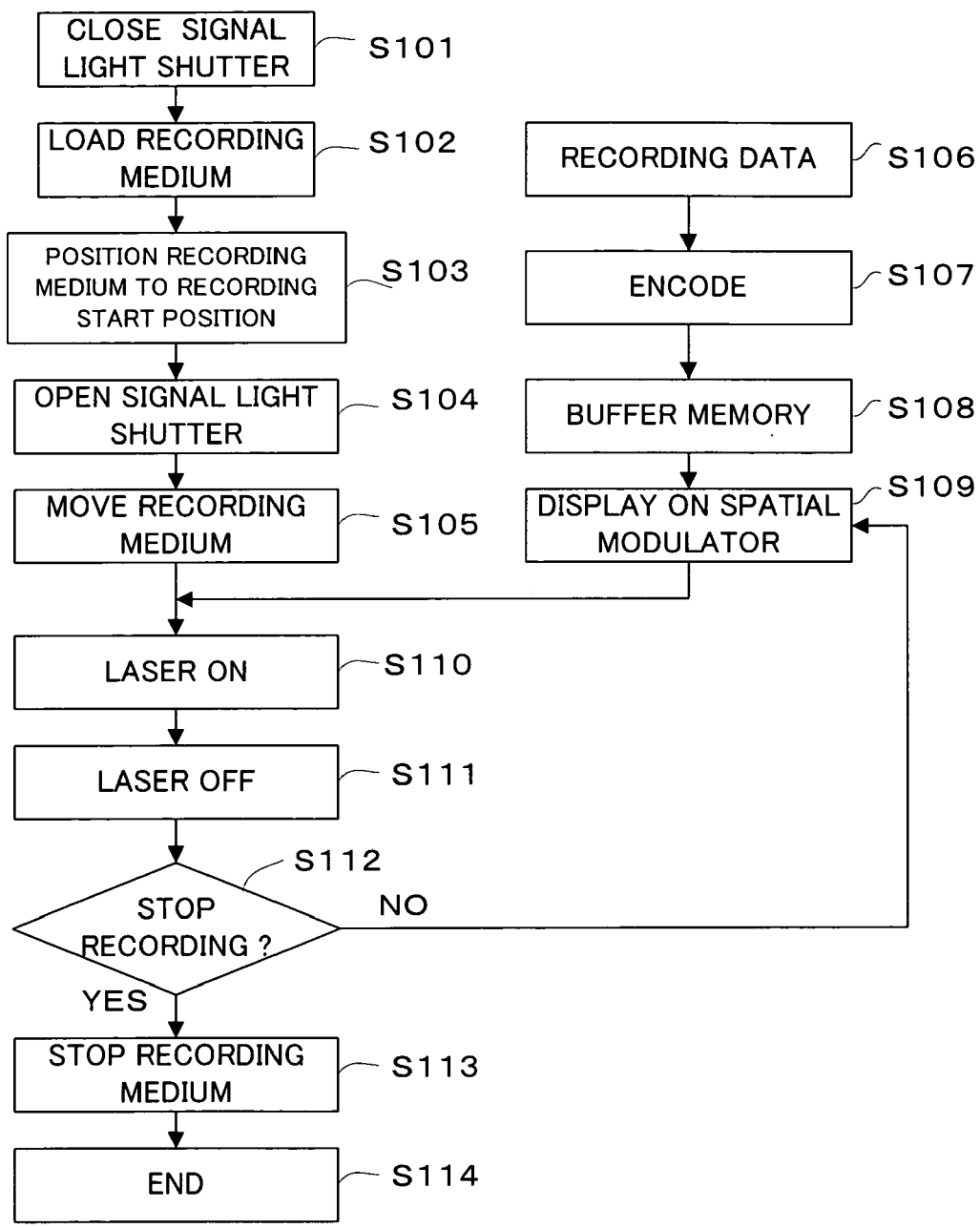
FIG. 2 is a flow chart showing an operational flow in the recording operation of the recording apparatus according to the present invention.
Figure 3A:
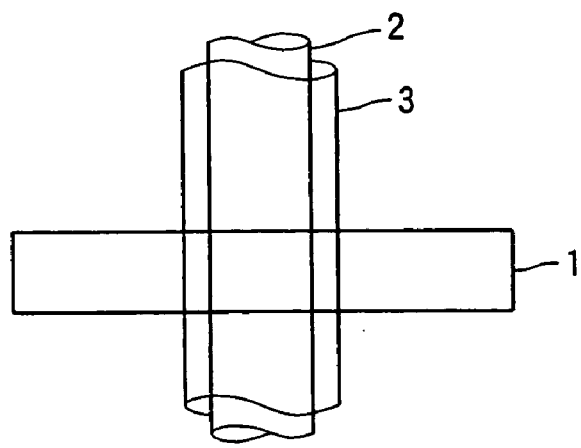
FIG. 3A shows a case that both lights are plane waves.
Figure 3B:
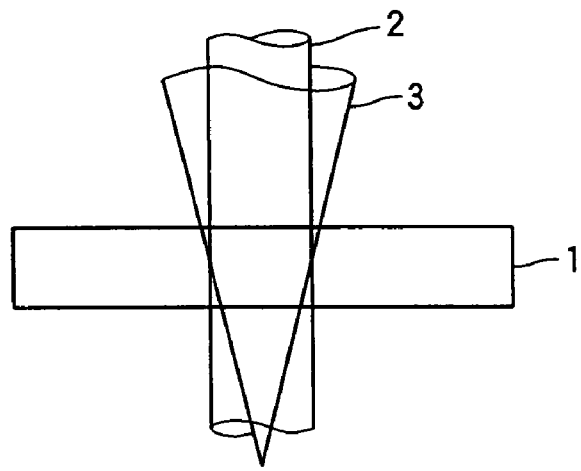
FIG. 3B shows a case that one is a plane wave and the other is a spherical wave.
Figure 3C:
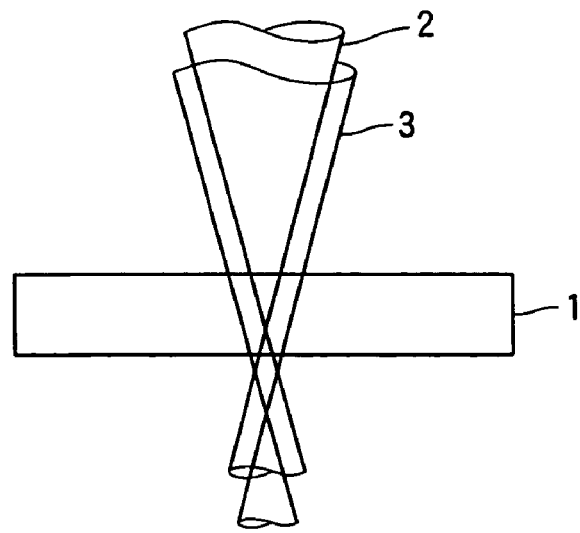
FIG. 3C shows a case that both lights are spherical waves.
Figure 4A:
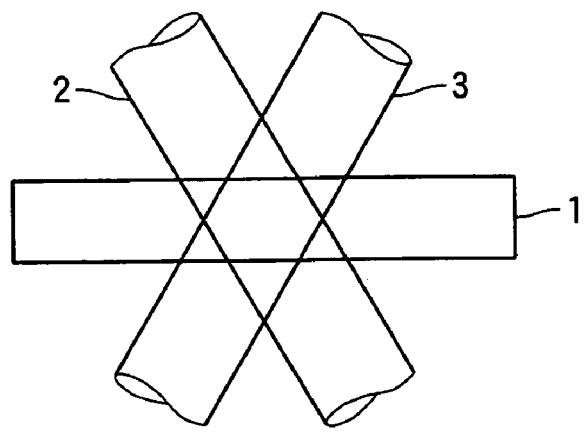
FIG. 4A shows a case that both lights are plane waves.
Figure 4B:
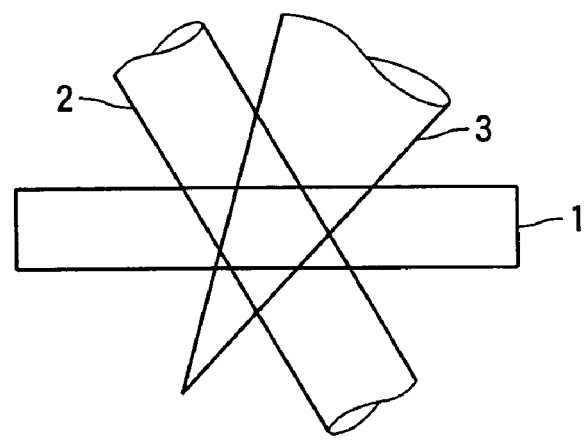
FIG. 4B shows a case that one is a plane wave and the other is a spherical wave.
Figure 4C:
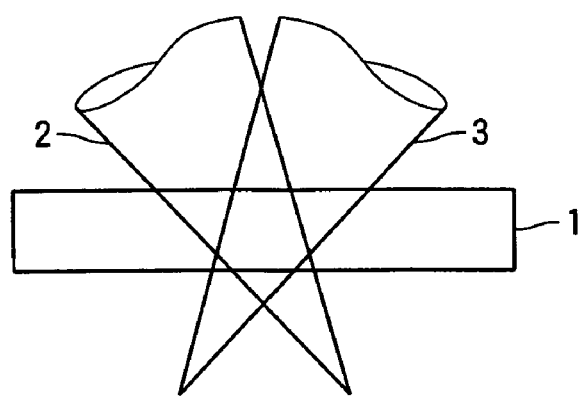
FIG. 4C shows a case that both lights are spherical waves.

An embodiment of the recording apparatus of the present invention will be discussed, with reference to FIG. 1 to FIG. 4. FIG. 1 is a view showing a construction of the embodiment of the recording apparatus according to the present invention. FIG. 2 is a flow chart showing an operational flow in the recording operation of the recording apparatus according to the present invention. FIG. 3 and FIG. 4 show relationships among a recording medium, a signal light and a reference light, used for the recording apparatus. FIG. 3 shows a signal light and a reference light incident along the same light axis. FIG. 3A shows a case that both lights are plane waves. FIG. 3B shows a case that one is a plane wave and the other is a spherical wave. FIG. 3C shows a case that both lights are spherical waves. FIG. 4 shows a signal light and a reference light incident with a predetermined angle. FIG. 4A shows a case that both lights are plan waves. FIG. 4B shows a case that one is a plane wave and the other is a spherical wave. FIG. 4C shows a case that both lights are spherical waves.

Incidentally, the recording apparatus of the embodiment discussed below is preferably a hologram recording apparatus for recording information as interference fringes of a light interference pattern into a hologram recording medium.

As shown in FIG. 1, the recording apparatus 101 of the embodiment is provided with: an optical system including a laser 11 for oscillating a pulse; a half mirror 12 for splitting pulse oscillation light from the laser 11 into a signal light 2 and a reference light 3; an optical shutter 13 disposed in an optical path of the signal light 2; a beam expander 14 for converting the signal light 2 into a light beam having a predetermined diameter; a spatial modulator 15 for modulating recording data into two-dimensional image information formed by a dot pattern; a Fourier transform lens 16 for irradiating a recording medium 1 with the signal light 2 modulated at the spatial modulator 15; mirrors 17, 18 for irradiating the recording medium 1 with the reference light 3 with a predetermined angle. The recording apparatus 101 is further provided with: a system control unit 21; a laser driver 22; a system controller 23; a recording medium drive mechanism 24; a modulator driver 25; a data input unit 26a; and a data processing unit 27.

The light beam oscillated from the laser 11 is split by the half mirror 12 into a light beam to be the signal light 2 and another light beam to be the reference light 3. The light beams are introduced into an optical path of a signal light optical system and another optical path of a reference light optical system, respectively. In this case, the light beam oscillated form the laser 11, or the signal light 2 and the reference light 3, may be adjusted by an ND (Neutral Density) filter, respectively, so as to have a predetermined light intensity.

The signal light 2 passing through the half mirror 12 is introduced onto the recording medium 1, through the optical shutter 13, the beam expander 14, the spatial modulator 15 and the Fourier transform lens 16, in the signal light optical system. The optical shutter 13 allows the passage of the signal light 2 in the recording operation. The passed signal light 2 is enlarged by the beam expander 14 to a parallel beam having a predetermined diameter. Then, a spatial modulation is performed on the recording data by the spatial modulator 15, which is disposed in the parallel beam for modulating the recording data into the two-dimensional image information formed by a dot pattern. In other words, the signal light 2 is spatially modulated into the two-dimensional lattice pattern formed of pixels allowing light transmission and pixels not allowing light transmission. After then, the signal light 2 is subjected to Fourier transform at the Fourier transform lens 16 and collected onto the recording medium 1 to form a Fourier transform image in the recording medium 1. For example, a liquid crystal device and the like may be used as the optical shutter 13 and the spatial modulator 15.

On the other hand, the reference light 3 is introduced by mirrors 17, 18 onto the recording medium 1 with a predetermined angle, and intersects with the signal light 2 in the recording medium 1. Incidentally, the reference light 3 may be converted by a beam expander into a light beam having a predetermined diameter, as in the case of the signal light 2. Mirrors 17, 18 are not limited to the example shown by FIG. 1, insofar as the reference light 3 is introduced onto the recording medium 1 with a predetermined angle.

The signal light 2 passed through the Fourier transform lens 16 and the reference light 3 form together interference fringes at an intersection point in the recording medium 1. That is, in order to record the data, the recording medium 1 is irradiated with the signal light 2 and the reference light 3 simultaneously to form the interference fringes whose refractive index is changed in the medium, and the formed interference fringes are recorded. The formation time of the interference fringes are controlled by the pulse oscillation time of the laser 11. If the pulse oscillation intensity of the laser 11 is sufficiently high, it is possible to form the interference fringes capable of forming a hologram for a very short time for example. Therefore, even if the recording medium 1 moves relative to the signal light 2 and the reference light 3, it is possible to record the interference fringes with a very high amplitude modulation.

Alternatively, the pulse oscillation timing of the laser may be achieved by detecting a synchronous signal recorded in advance in the recording medium, and by pulse-oscillating the laser on the basis of this synchronous signal.

Furthermore, the pulse width of the laser may be determined on the basis of a ratio between an interval of the interference fringe to be recorded and a movement speed of the recording medium relative to the signal light and reference light.

The system control unit 21 has a main CPU and controls the entire operation of the recording apparatus 101. The laser driver 22 controls the pulse oscillation, i.e. pulse width, oscillation time, oscillation interval, under the system control unit 21. The system controller 23 controls, for example, the optical shutter 13, the spatial modulator 15 and so on.

Furthermore, the recording medium drive mechanism 24 produces a movement of the recording medium 1 relative to the signal light 2 and reference light 3. The mechanism 24 may be a mechanism for rotating the recording medium 1 along a plane perpendicular to the optical axis of the signal light 2, or may be a mechanism for moving the recording medium straightly in X-Y directions along said plane. Furthermore, it is possible to move the signal light 2 and the reference light 3 relative to the recording medium 1.

The modulation driver 25 is for inputting the recording data into the spatial modulator 15 and driving the spatial modulator 15. The data input unit 26a is for receiving or capturing the recording data, such as music data or video data. The data processing unit 27 is for converting the received or captured data on the basis of a record format, adding another data for the signal processing, or performing the processing for the error correction. The data processed at the data processing unit 27 is input into the spatial modulator 15 via the modulator driver 25.

Incidentally, an optical switch may be disposed in a resonator of the pulse oscillation laser in order to control the pulse operation of the laser more accurately.

Now, an operational flow of recording operation of the aforementioned recording apparatus 101 will be discussed with reference to FIG. 2. Firstly, before starting the recording operation, the optical shutter 13 is closed to optically isolate the recording medium 1 from the signal light 2 (step S101). Under the condition of S101, the recording medium 1 is loaded into/onto the recording medium drive mechanism 24 (step S102), and moved to be set on a recording starting position (step S103). Then, the optical shutter 13 is opened so that the recording medium 1 is irradiated with the signal light 2 (step S104). Then, the recording medium 1 is begun to be moved relative to the signal light 2 and the reference light 3 (step S105). That is, the recording medium 1 is rotated or straightly moved.

On the other hand, the data received or taken to be recorded (step S106) is encoded on the basis of a predetermined record format (step S107), and temporarily recorded into the buffer memory (step S108). Then, the data is input into the spatial modulator 15 according to the recording timing and then displayed (step S109).

Next, the laser 11 oscillates the pulse (step S110, step S111). By the pulse-oscillation, the data input into the spatial modulator 15 and displayed as the two-dimensional image formed by the dot pattern is recorded into the recording medium 1 as interference fringes. Next, it is determined whether or not the recording is to be continued (step S112). If so, the operational flow goes back to step S109 to display the next recording data on the spatial modulator 15 and then perform step S110 and step S111. During these steps, the recording medium 1 moves so that the next data is recorded at the adjacent position. On the other hand, if the recording is finished, the movement of the recording medium 1 is stopped (step S113) and the recording operation ends (step S114).

As discussed above, according to the embodiment of the recording apparatus of the present invention, the pulse oscillation laser is used for a light source for forming the interference fringes, which constitute, for example, a hologram corresponding to the data by using the signal light and the reference light and recording the interference fringes into the recording medium. By the use of the pulse oscillation laser, it is possible to obtain a high-power output. Therefore, the recording can be achieved by short time light irradiation. Therefore, it is possible to form the interference fringes of large amplitude and high modulation degree, even if the recording medium moves relative to the signal light and the reference light, and form the hologram by using this interference fringes.

Now, a relationship among the recording medium 1, the signal light 2 and the reference light 3 will be discussed. Regarding arrangements of the signal light 2 and the reference light 3 used in the recording apparatus according to the present invention, any one of the arrangement that the signal light 2 and the reference light 3 enter the recording medium 1 along the same optical axis as shown in FIG. 3 and the arrangements that the signal light 2 and the reference light 3 enter the recording medium 1 with a predetermined angle as shown in FIG. 4 can be used. FIG. 3A and FIG. 4A show a case that both lights are plane waves. FIG. 3B and FIG. 4B show a case that one light is a plane wave and the other is a spherical wave. FIG. 3C and FIG. 4C show a case that both lights are spherical waves. Incidentally, the signal light 2 and the reference light 3 in these figures may be vice versa.

Furthermore, a photosensitive medium such as lithium niobate (LN) is often used as the recording medium 1, for recording a three-dimensional light interference patterns as spatial change of the refractive index in the recording medium. For example, in a use for hologram multi-recording, the LN has advantages of relatively long storage life after recording, having the ability of fixing, having high usability or ease of treating, and so on.

Figure 5A:
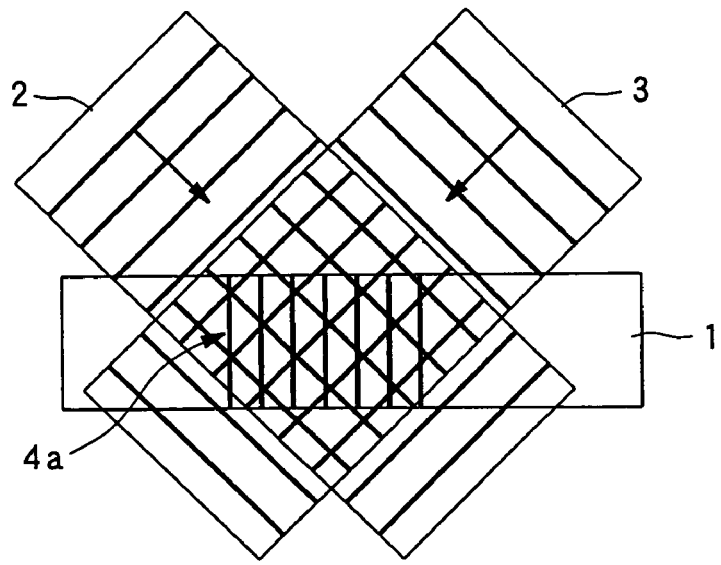
FIG. 5A shows a case that the recording medium does not move relative to the lights.
Figure 5B:
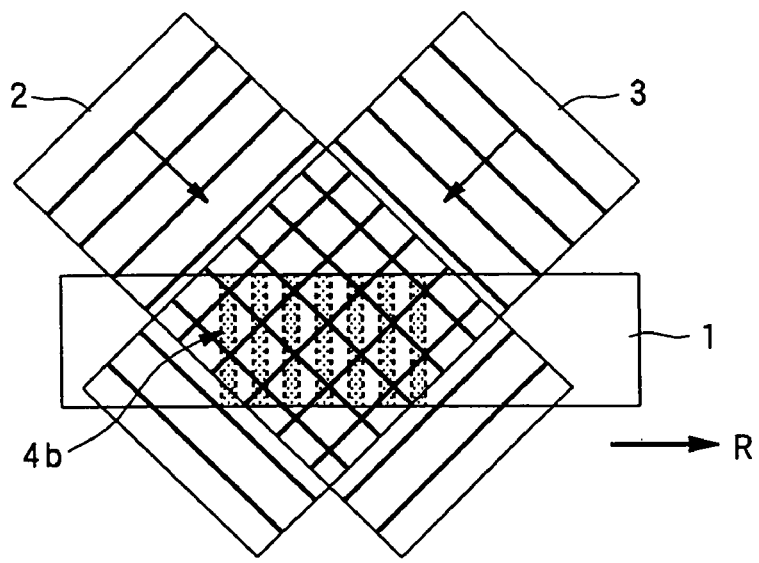
FIG. 5B shows a case that the recording medium moves relative to the lights in a direction shown by an arrow R.

Now, the interference fringes formed by the recording apparatus 101 will be discussed. As shown in FIG. 5, the interference fringes 4a (FIG. 5A) and the interference fringes 4b (FIG. 5B) are formed respectively in the recording medium 1, due to the signal light 2 and the reference light 3 incident onto the recording medium 1. Herein, FIG. 5A shows a case that the recording medium does not move relative to the signal light 2 and the reference light 3. FIG. 5B shows a case that the recording medium moves relative to the signal light and the reference light.

That is, in FIG. 5A, since the recording medium 1 does not move relative to the signal light 2 and the reference light 3, the interference fringes 4a formed in the recording medium 1 by the signal light 2 and the reference light 3 shows a high amplitude modulation. Since the recording apparatus 1 according to the present invention uses the signal light 2 and the reference light 3 capable of producing a high power in a short time by using the pulse oscillation laser, the desirable interference fringes 4a as shown in FIG. 5A can be formed, even if the recording medium 1 moves relative to the signal light 2 and the reference light 3.

On the other hand, FIG. 5B shows the interference fringes 4b formed in the case that the recording medium 1 moves relative to the signal light 2 and the reference light 3, and the light irradiation time is long to form the interference fringes, for example in the case that the long light irradiation time is required because of the low laser power. That is, if the recording medium 1 moves relative to the signal light 2 and the reference light 3 in the direction shown by an arrow R, the interference fringes 4b formed in the recording medium 1 by the signal light 2 and the reference light 3 shows a deteriorated amplitude modulation, because the position of the interference fringes moves in the recording medium 1 during the formation of the interference fringes 4b.

Figure 6:
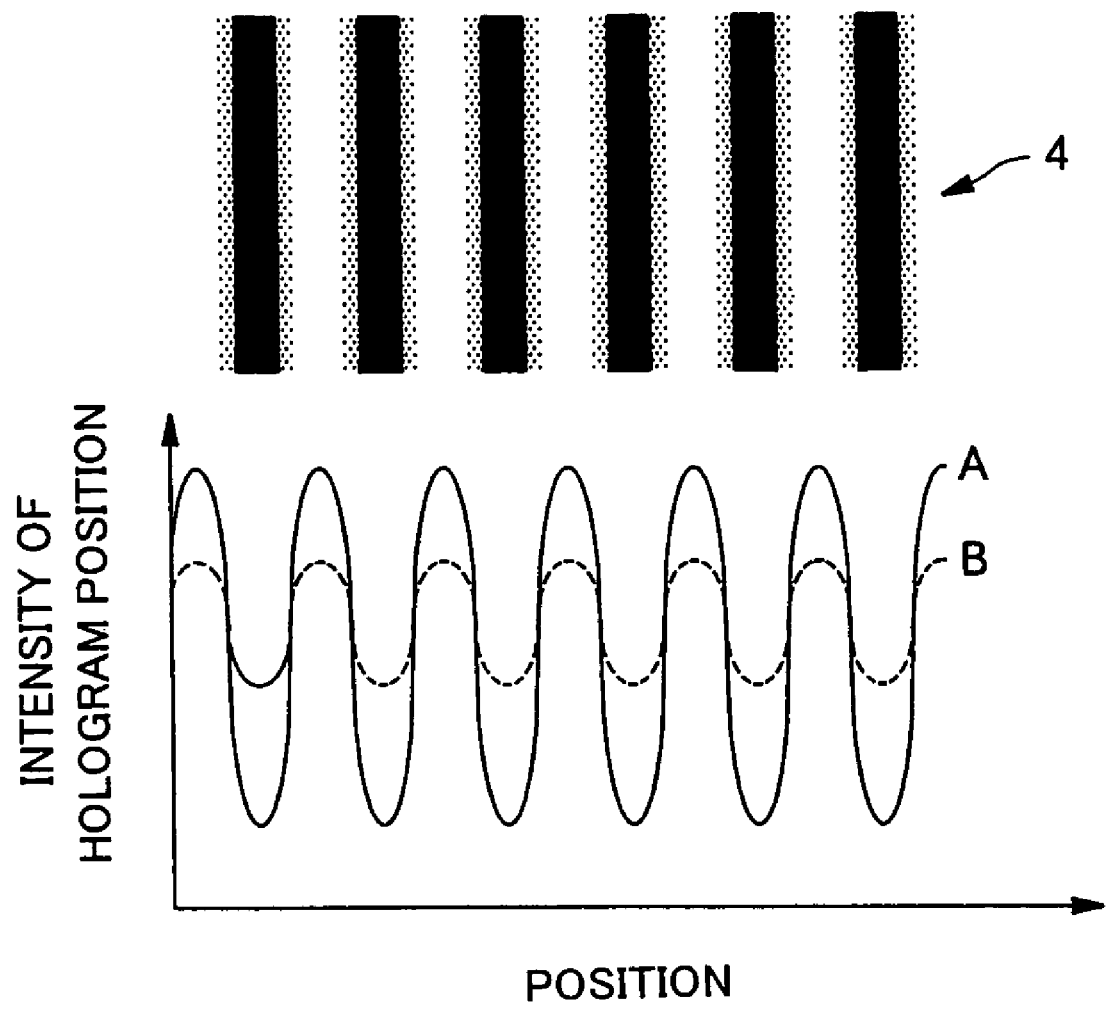
FIG. 6 is a view showing the intensity of a interference fringe position, in the case that a recording medium moves relative to a signal light and a reference light.

FIG. 6 is a view showing the relationships shown in FIG. 5 as relationships between positions of the interference fringes and the intensity of the interference fringes. The upper part of the FIG. 6 shows interference fringes 4. The lower part shows the intensity corresponding to the position of the interference fringes 4. In the lower part of FIG. 6, symbol "A" is representative of the interference fringe intensity in the case that the recording medium 1 does not move relative to the signal light 2 and the reference light 3, and symbol "B" is representative of the interference fringe intensity in the case that the recording medium 1 moves relative to the signal light 2 and the reference light 3.

As discussed above, if the recording medium moves relative to the signal light and the reference light, it is necessary to record the fringes before the movement (travel distance) becomes large. For example, assume a case that interference fringes having a pitch K (m) is recorded for recording time S (sec), with the signal light and the reference light having the wavelength $\lambda$ (m), the power P, and the mixing angle (intersect angle) $\theta$ (rad), under a condition that the relative movement of the recording medium is eliminated. In this case, the energy required for this recording is defined by P×S. Furthermore, the pitch K is defined by $K=\lambda/(2\times\sin(\theta/2))$.

Next, in the case that the recording medium moves relative to the signal light and the reference light with a velocity V (m/sec) and the amplitude of the intensity B requires 0.25% or more to the amplitude of the intensity A, the recoding must be completed before the movement (travel distance) excesses 78% to the interference fringe pitch. Therefore, the recording is performed with a pulse within (0.78×K)/V (sec) having the energy of P×(0.78×K)/V or more. The pulse oscillation laser is suitably used as the light source satisfying these requirements in view of the power and the controllability of oscillation.

Alternatively, the pulse width of the laser may be determined corresponding to a ratio between the pitch of the interference fringes to be recorded and a movement speed of the recording medium relative to the signal light and the reference light.

Figure 7:
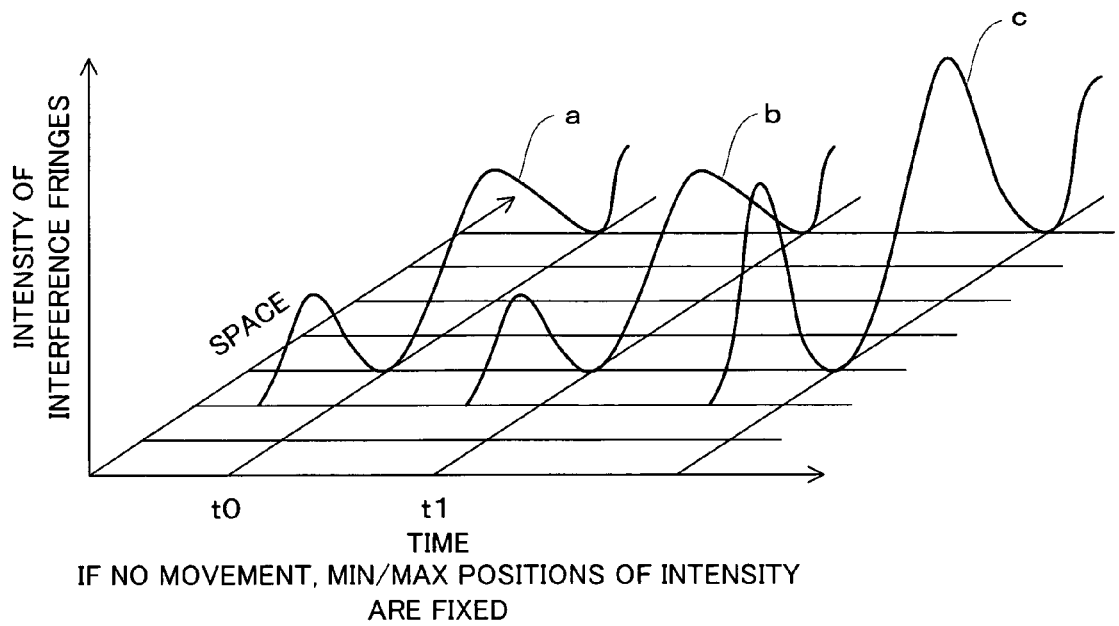
FIG. 7 is a view showing the intensity of interference fringes, in the case that a recording medium does not move relative to a signal light and a reference light.

Furthermore, FIG. 7 shows the interference fringe intensity in the case that the recording medium 1 does not move relative to the signal light 2 and the reference light 3. In FIG. 7, symbol "a" is representative of the interference fringe intensity formed at time t0, symbol "b" is representative of the interference fringe intensity formed at time t1 slightly after t0, and symbol "c" is representative of the interference fringe intensity obtained by synthesizing "a" with "b". Since the recording medium 1 does not move relative to the signal light 2 and the reference light 3, the interference fringes are formed at the constant positions, so that the interference fringe intensity of "c" shows a good amplitude modulation as shown by A in FIG. 6.

Figure 8:
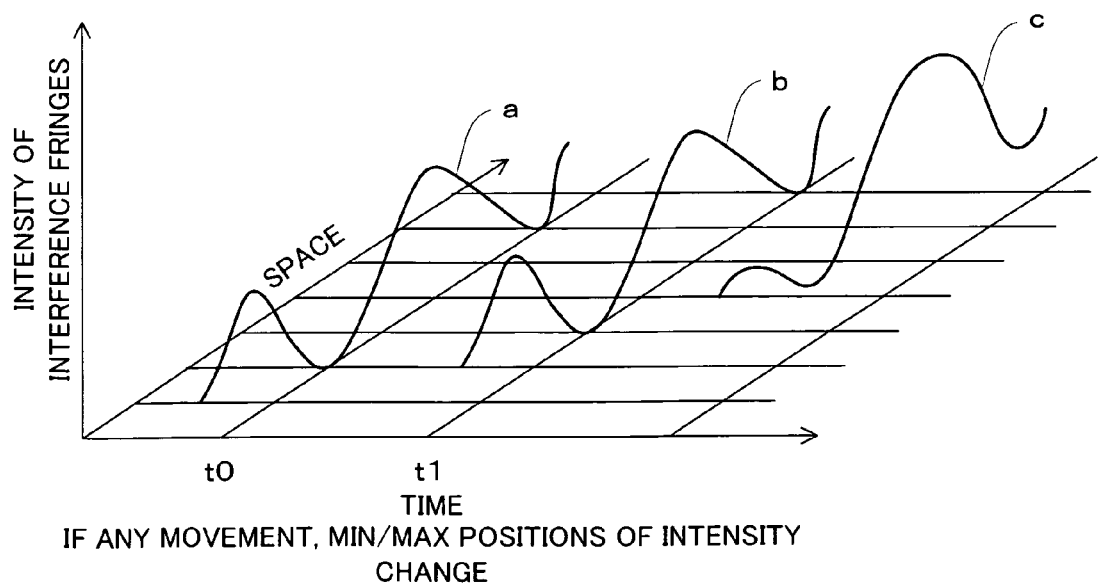
FIG. 8 is a view showing the intensity of interference fringes, in the case that a recording medium moves relative to a signal light and a reference light.

On the other hand, FIG. 8 shows the interference fringe intensity in the case that the recording medium 1 moves relative to the signal light 2 and the reference light 3. In FIG. 8, symbol "a" is representative of the interference fringe intensity formed at time t0, symbol "b" is representative of the interference fringe intensity formed at time t1 slightly after t0, and symbol "c" is representative of the interference fringe intensity obtained by synthesizing "a" with "b". Since the recording medium 1 moves relative to the signal light 2 and the reference light 3, the interference fringes are formed at the spatially variable positions, so that the interference fringe intensity of "c", spatially synthesized "a" with "b", shows a deteriorated amplitude modulation as shown by B in FIG. 6.

EMBODIMENT OF REPRODUCTION APPARATUS

An embodiment of the reproduction apparatus according to the present invention will be discussed, with reference to FIG. 9.

Incidentally, the reproduction apparatus of the embodiment discussed below is preferably a hologram reproduction apparatus for reproducing information recorded as interference fringes, which form a light interference pattern, from a hologram recording medium.

Figure 9:
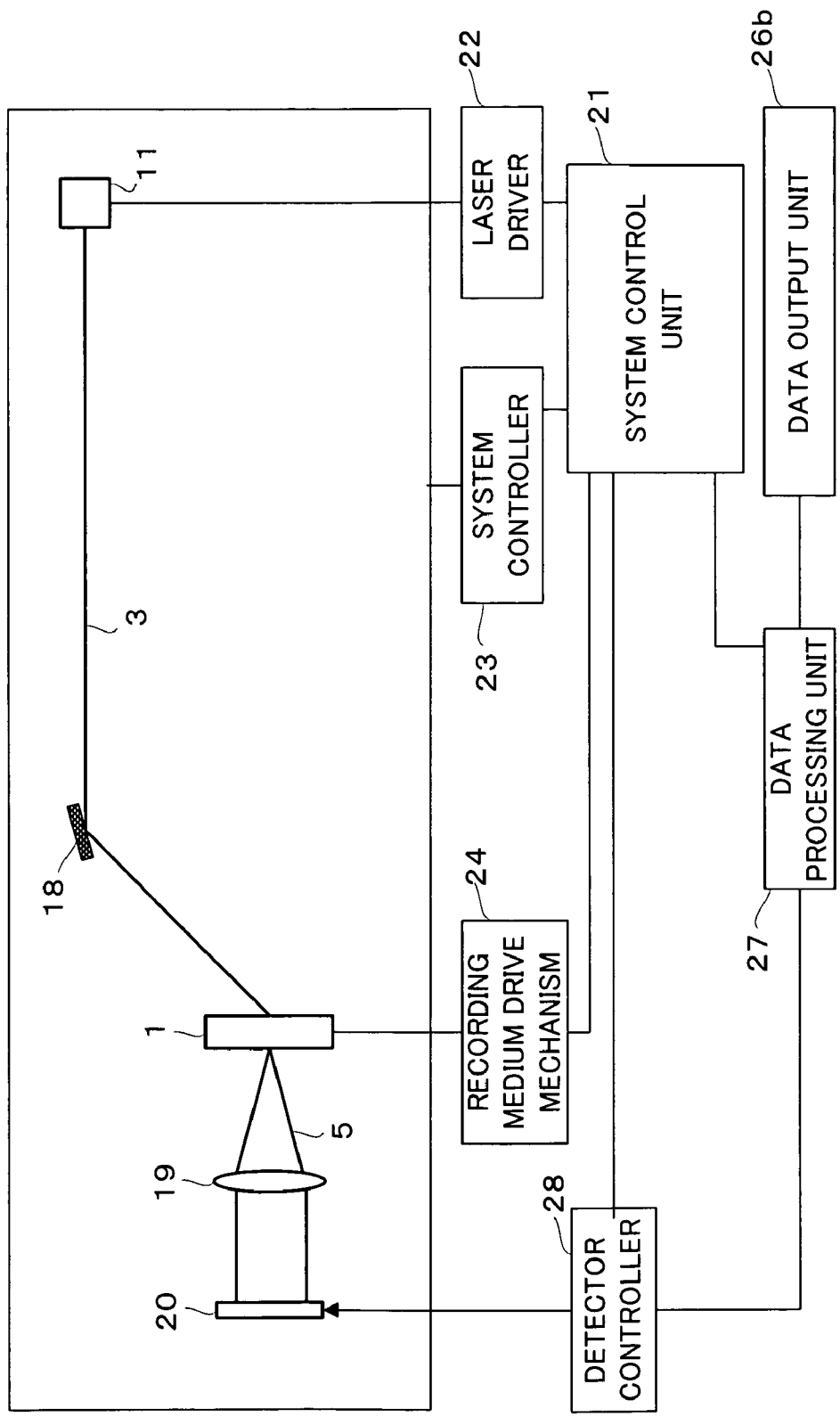
FIG. 9 is a view showing a construction of an embodiment of the reproduction apparatus according to the present invention.

As shown in FIG. 9, the reproduction apparatus 102 of the embodiment is provided with: an optical system including a laser 11 for oscillating a pulse; a mirror 18 for irradiating the recording medium 1 with the reference light 3 with a predetermined angle; an inverse Fourier transform lens 19 for subjecting the diffraction light from the recording medium to an inverse Fourier transform; a two-dimensional image detector 20 for detecting the image subjected to the inverse Fourier transform. The reproduction apparatus 102 is further provided with: a system control unit 21; a laser driver 22; a system controller 23; a recording medium drive mechanism 24; a data input unit 26b; a data processing unit 27; and a detector controller 28.

The light beam output from laser 11 is adjusted by the mirror 18 to enter the recording medium 1, as the reference light 3 with a predetermined angle i.e. with an angle the same as the incident angle of the reference light 3 used for the recording operation. In this case, the light beam output from the laser 11 may be adjusted by an ND (Neutral Density) filter so as to have a predetermined light intensity.

The reference light 3 is introduced onto the recording medium 1, and the diffraction light 5 from the recording medium 1 forms an image on the image generator 20 via the inverse Fourier transform lens 19. For example, a two-dimensional detector array made of CCD or CMOS may be used as the image detector 20. Pixels of the image generator 20 do not necessarily correspond uniquely to pixels of the liquid crystal used for the spatial modulator of the recording apparatus. There are various possible correspondence patterns such as 1:4 or 4:1. Thus, in order to reproduce the recorded data, the recorded data can be read by irradiating the interference fringes recorded in the recording medium 1 with only the reference light 3. Depending on the recording medium property, the intensity of the reference light 3 may be adjusted to a sufficiently low value in comparison to the recording intensity, so as not to delete the recorded information.

The system control unit 21 has a main CPU, for controlling the entire operation of the reproduction apparatus 102. The laser driver 22 controls the pulse oscillation, under the system control unit 21. The system controller 23 controls, for example, the optical system including the image detector 20 and so on.

With regard to the pulse width in the reproduction, if the condition is the same as that in the recording, the exposure time Tmax should be $(0.78 \times K)/V$ (sec) or less to separate interference fringes from each other. Furthermore, Tmin should be $(C \times N)/(P \times \eta)$ (sec) in view of the light-receptive energy required for detecting the interference fringes at the image detector 20 (wherein P is power of light source, $\eta$ is diffraction efficiency of interference fringes, N is the number of pixels of image generator 20, C is light-receptive energy required for one pixel of image detector 20). That is, the laser driver 22 controls the pulse width within a range from Tmin to Tmax.

Furthermore, in the case that the synchronous signal is recorded in the recording medium, this synchronous signal may be firstly read to control the oscillation interval of pulses on the basis of this synchronous signal.

Furthermore, the recording medium drive mechanism 24 produces a movement of the recording medium 1 relative to the reference light 3. For example, the recording medium drive mechanism 24 rotates the recording medium 1 while keeping a predetermined incident angle relative to the reference light 3, or moves the recording medium 1 straightly in X-Y direction. Incidentally, the reference light 3 may be moved relative to the recording medium 1. Furthermore, the reference light 3 may be introduced directly with a predetermined angle. In this case, the mirror 18 is omitted.

The detector controller 28 controls the operation of the image detector 20 and reads the two-dimensional image information corresponding to the recorded data generated on the image detector 20. Furthermore, the data processing unit 27 converts the data read at the detector controller 28 on the basis of the record format, or performs the error correction to reproduce the recorded data. The reproduced data, such as music or video data, is output to the external device via the data output unit 26b.

Figure 10:
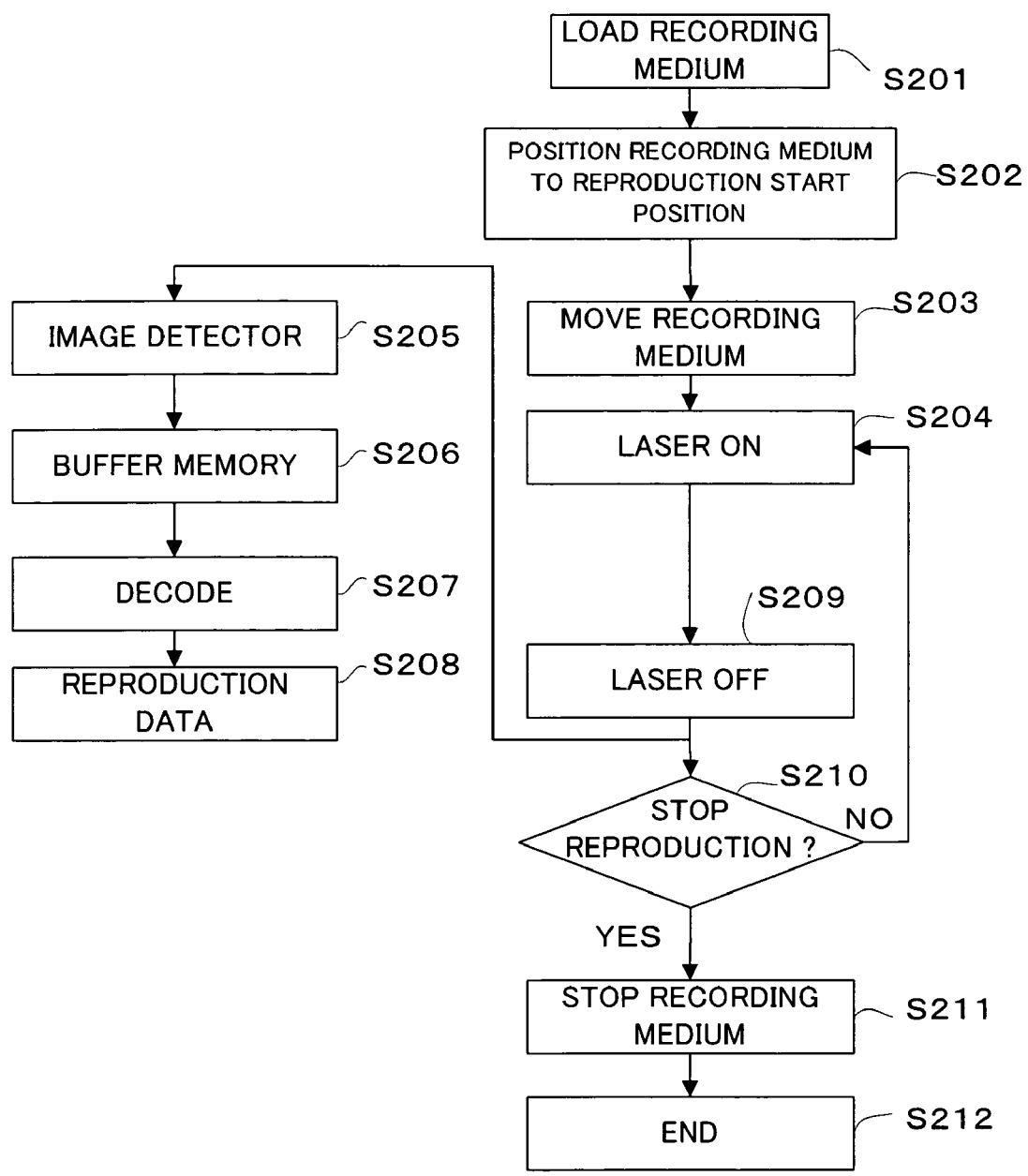
FIG. 10 is a flow chart showing an operational flow in the reproduction operation of the reproduction apparatus according to the present invention.

Next, the operational flow of the reproduction of the aforementioned reproduction apparatus 102 will be discussed, with reference to FIG. 10. Firstly, the recording medium 1 is loaded into/onto the recode medium drive mechanism 24 (step S201), and then the recording medium 1 is moved to be placed at the reproduction start position (step S202). Then, the recording medium 1 is begun to be moved relative to the reference light 3 (step S203). That is, the recording medium 1 is rotated or straightly moved. When the target data recorded in the recording medium 1 comes to the reproduction position, the oscillation of the laser 11 is started (step S204) and terminated after a predetermined pulse width (step S209).

On the other hand, while the laser 11 oscillates, the image detector 20 detects the image produced by converting the diffraction light 5, which is obtained from the recording medium 1 irradiated with the reference light 3, with the inverse Fourier transform lens 19 (step S205). For example, in the case that a CCD type detector used as the image detector 20, the electric charge during the oscillation of the laser 11 is stored. The detected image data may be temporarily stored into the buffer memory, for example, disposed in the detector controller 28 (step S206), decoded at the data processing unit 27 (step S207), and output as the reproduction data from the data output unit 26b to the external apparatus (step S208).

Next, it is determined whether or not the reproduction is to be continued (step S210). If so, the operational flow goes back to step S204 to irradiate the next to-be-reproduced data with the laser light to be the reference light 3 and performs the reproduction operations from step S205 to step S208. On the other hand, if the reproduction is finished, the movement of the recording medium 1 is stopped (step S211) and the reproduction is terminated (step S212). In this case, predetermined procedures are naturally required to terminate the reproduction.

As discussed above, according to the embodiment of the reproduction apparatus of the present invention, the use of the pulse oscillation laser as the reference light for the recording medium makes it possible to enhance the power of the output, and to thereby perform the reproduction with a short time light irradiation. As a result, the data of improved S/N ration can be reproduced, even if the recording medium moves relative to the reference light.

FIRST EMBODIMENT OF RECORDING REPRODUCTION APPARATUS

The first embodiment of the recording reproduction apparatus according to the present invention will be discussed, with reference to FIG. 11. In this embodiment, a pulse oscillation laser is used as a light source, and it is possible to generate interference fringes, which form a hologram for example, corresponding to two-dimensional image data of recording data with high amplitude modulation, and to reproduce the data showing good S/N ratio.

Incidentally, the recording reproduction apparatus of the embodiment discussed below is preferably a hologram recording reproduction apparatus for recording information as interference fringes, i.e. a light interference pattern, into the hologram recording medium, and reproducing the information recorded as the interference fringes, i.e. the light interference pattern.

Figure 11:
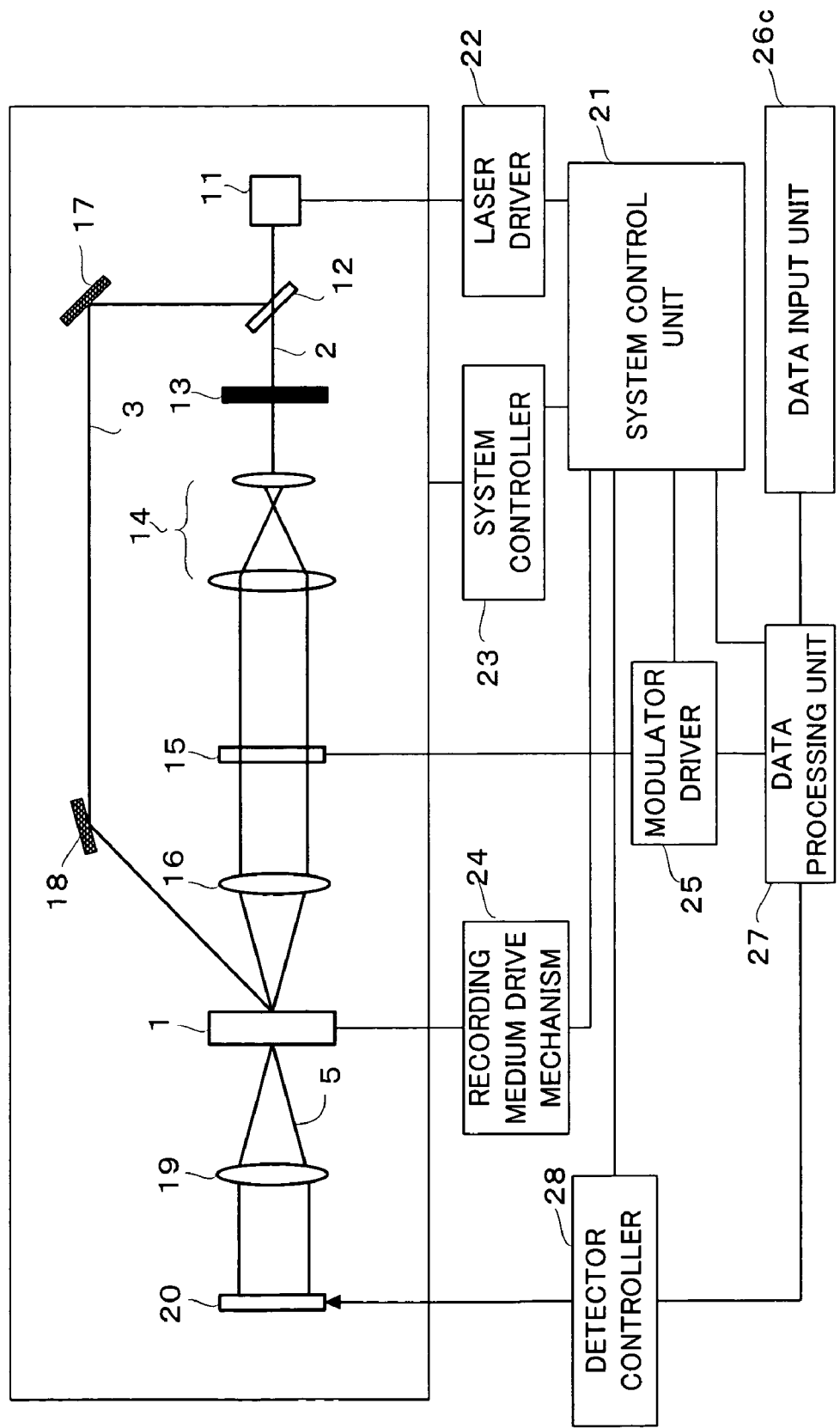
FIG. 11 is a view showing a construction of a first embodiment of the recording reproduction apparatus according to the present invention.

As shown in FIG. 11, the recording reproduction apparatus 103 of the embodiment is provided with: an optical system including a laser 11 for oscillating pulse, a half mirror 12 for splitting the pulse oscillated laser light from the laser 11 into the signal light 2 and the reference light 3, an optical shutter 13 disposed in a light path of the signal light 2, a beam expander 14 for converting the signal light 2 into a light beam having a predetermined diameter, a spatial modulator 15 for modulating recording data into two-dimensional image information, a Fourier transform lens 16 for irradiating the recording medium 1 with the signal light modulated the spatial modulator 15, mirrors 17, 18 for introducing the reference light 3 onto the recording medium 1 with a predetermined angle, an inverse Fourier transform lens 19 for subjecting diffraction light 5 from the recording medium 1 to an inverse Fourier transform, a two-dimensional image generator 20 for detecting the image after subjected to the inverse Fourier transform. The recording reproduction apparatus 103 is further provided with: a system control unit 21; a laser driver 22; a system controller 23; a recording medium drive mechanism 24; a modulator driver 25; a data input/output unit 26c; a data processing unit 27; and a detector controller 28.

Next, the recording operation of the recording reproduction apparatus 103 will be discussed.

The light beam output from the laser 11 is split at the half mirror 12 into a light beam to be the signal light 2 and another light beam to be the reference light 3. The light beams are introduced to a light path of a signal light optical system and a light path of a reference light optical system, respectively. In this case, the light beam output from the laser 11, or the signal light 2 and the reference light 3 may be adjusted individually by ND filters, so as to have a predetermined light intensity, respectively.

The signal light 2 passing through the half mirror 12 is introduced onto the recording medium 1 via the signal light optical system including the optical shutter 13, the beam expander 14, the spatial modulator 15 and the Fourier transform lens 16. The signal light 2 passes through the optical shutter 13 in the recording, and then enlarged to a parallel beam having a predetermined diameter. After the data is spatially modulated by the spatial modulator 15 disposed in the parallel light beam for modulating the recording data into a two-dimensional image information formed by a dot pattern, i.e. after the signal light 2 is spatially modulated into the two-dimensional lattice pattern formed of pixels allowing light transmission and pixels not allowing light transmission, the pattern information is subjected to Fourier transform by the Fourier transform lens 16 and focused onto the recording medium 1 to generate a Fourier transform converted image in the recording medium 1. Incidentally, a liquid crystal device may be used as the optical shutter 13 and the spatial modulator 15, for example.

On the other hand, the reference light 3 is introduced by mirrors 17, 18 onto the recording medium 1 with a predetermined angle, and intersects with the signal light 2 in the recording medium 1. Incidentally, similarly to the signal light 2, the reference light 3 may be converted by a beam expander into a parallel beam having a predetermined diameter. Furthermore, mirrors 17, 18 are not limited to this embodiment, insofar as the reference light 3 is introduced onto the recording medium 1 with a predetermined angle.

The signal light 2 passing through the Fourier transform lens 16 generates interference fringes, which form a hologram for example, together with the reference light 3, at their intersect portion in the recording medium 1. That is, for the data recording, the signal light 2 is introduced onto the recording medium 1 simultaneously with the reference light 3, so that the interference fringes with the refractive index being changed is formed and recorded in the recording medium 1.

Next, the reproduction operation of the recording reproduction apparatus 103 will be discussed.

The light beam output from the laser 11 is adjusted by mirrors 17, 18 to enter the recording medium 1 with a predetermined angle, i.e. an angle the same as the incident angle of the reference light 3 used for the recording. In this case, the light beam output from the laser 11 may be adjusted by an ND filter so as to have a predetermined light intensity. In this case, the optical shutter 13 is completely closed and the beam expander 14, the spatial modulator 15, the Fourier transform lens 16 and the modulation driver 25 are not used.

The reference light 3 is introduced onto the recording medium 1, and then the diffraction light 5 from the recording medium 1 forms an image on the image detector 20 via the inverse Fourier transform lens 19. For example, a two-dimensional detector array, which may be made of CCD or CMOS, may be used as the image detector 20. Pixels of the image detector 20 are not limited to one-to-one relationship with pixels of the liquid crystal used as the spatial modulator of the recording apparatus. There are various possible patterns, such as 1:4 relationship, 4:1 relationship and so on. Thus, for the reproduction of the recorded data, the recorded data can be read by irradiating the interference fringes recorded in the recording medium 1 only with the reference light 3. The light intensity of the reference light 3 may be adjusted to a sufficiently low value in comparison with that in the recording, so as not to delete the recorded information depending on the property of the recording medium.

In order to control the aforementioned recording operation and reproduction operation, the system control unit 21 has a main CPU for controlling the entire operation of the recording apparatus 103. The laser driver 22 controls the pulse oscillation of the laser 11, i.e. pulse width, oscillation time, under the system control unit 21. The system controller 23 controls the optical shutter 13, the spatial modulator 15 and so on, for example.

Furthermore, the recording medium drive mechanism 24 produces a movement of the recording medium 1 relative to the signal light 2 and the reference light 3. For example, the mechanism is provided with a mechanism for rotating the recording medium 1 in a plane perpendicular to the light axis of the signal light 2, or a mechanism for straightly moving the recording medium 1 in X-Y direction. Alternatively, the signal light 2 and the reference light 3 may be moved relative to the recording medium 1.

The modulator driver 25 is for inputting the recording data into the spatial modulator 15 and driving the spatial modulator 15. The data input/output unit 26c is for inputting the recording data and outputting the reproduced data. The data processing unit 27 is for converting the recording data on the basis of the record format, adding the data for the signal processing to the recording data or performing the processing for the error correction on the recording data, and performs the error correction and decoding of the reproduced data. Furthermore, the detector controller 28 controls the operation of the image detector 20, and reads the two-dimensional image information corresponding to the recorded data generated on the image detector 20.

According to the aforementioned embodiment of the recording reproduction apparatus, it is possible to record and reproduction data on the recording medium. Even in the case that the recording medium moves relative to the signal light and the reference light, it is possible to generate the interference fringes in the recording medium from the reference light and the two-dimensional image data corresponding to the recording data with the high amplitude modulation, and to reproduce the data showing the good S/N ratio.

SECOND EMBODIMENT OF RECORDING REPRODUCTION APPARATUS

The second embodiment of the recording reproduction apparatus according to the present invention will be discussed, with reference to FIG. 12. In the embodiment, a continuous oscillation laser is used as a light source, and it is possible to generate interference fringes in the recording medium with the high intensity amplitude from a reference light and two-dimensional image data corresponding to recording data and to reproduce the data showing good S/N ratio, even in the case that the recording medium moves relative to the signal light and the reference light.

Incidentally, the recording reproduction apparatus of the embodiment discussed below is preferably a hologram recording reproduction apparatus for recording information as interference fringes, i.e. a light interference pattern, into a hologram recording medium, and reproducing the information recorded as the interference fringes, i.e. the light interference pattern, from the hologram recording medium.

Figure 12:
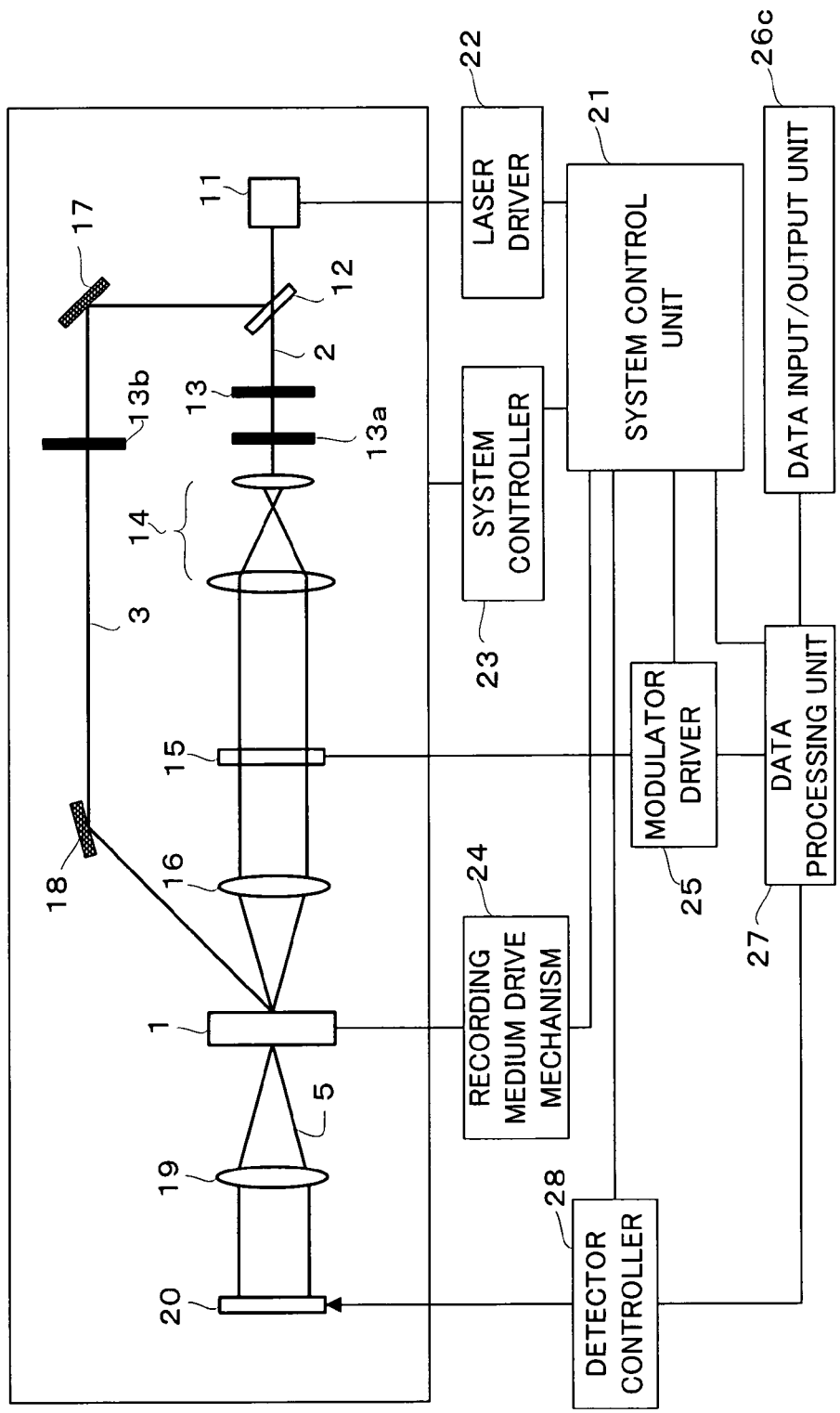
FIG. 12 is a view showing a construction of a second embodiment of the recording reproduction apparatus according to the present invention.

As shown in FIG. 12, the recording reproduction apparatus 104 of the embodiment is provided with: an optical system including a continuous oscillation laser 11a, a half mirror 12 for splitting the continuous oscillated laser light from the laser 11 into the signal light 2 and the reference light 3, an optical shutter 13 and an optical shutter 13a disposed in the light path of the signal light 2, a beam expander 14 for converting the signal light 2 into a light beam having a predetermined diameter, a spatial modulator 15 for modulating the recording data into two-dimensional image information, a Fourier transform lens 16 for irradiating the recording medium 1 with the signal light 2 modulated at the spatial modulator 15, an optical shutter 13b disposed in the reference light optical system, mirrors 17, 18 for introducing the reference light 3 onto the recording medium 1 with a predetermined angle, an inverse Fourier transform lens 19 for subjecting diffraction light 5 from the recording medium 1 to inverse Fourier transform, a two-dimensional image detector 20 for detecting the image subjected to the inverse Fourier transform. The recording reproduction apparatus 104 is further provided with: a system control unit 21; a laser driver 22; a system controller 23; a recording medium drive mechanism 24; a modulator driver 25; a data input/output unit 26c; a data processing unit 27; a detector controller 28 and so on.

Firstly, in the reproducing operation, the laser 11 is continuously oscillated, and the optical shutter 13a is opened for a very short time to pass the signal light for the recording. The passed signal light is converted by the beam expander 14 to a parallel beam having a predetermined diameter, and enters the spatial modulator 15 disposed in the parallel beam. The signal light 2 passed through the spatial modulator 15 is subjected to Fourier transform at the Fourier transform lens 16 and enters the recording medium 1. On the other hand, the reference light 3 is split at the half mirror 12, and introduced by mirrors 17, 18 with a predetermined angle, and intersects with the signal light 2 in the recording medium 1. Interference fringes are generated at the intersect position of the signal light 2 and the reference light 3 and the data is recorded.

In the case that the recording medium 1 moves relative to the signal light 2 and the reference light 3, although the amplitude modulation of the interference fringes generated in the recording medium 1 becomes smaller, it is possible to obtain the interference fringes having larger amplitude modulation if the optical shutter 13a is opened for a very short time. In this case, the open time of the optical shutter 13a is time sufficient to obtain energy for generating interference fringes forming a hologram for example, and depends on the power of the continuous oscillation laser 11a. Therefore, as a matter of course, the high power laser 11a is preferable in order to shorten the open time.

Alternatively, the open time of the optical shutter 13a may be adjusted similarly to the control of the pulse width discussed relating to the recording apparatus. Furthermore, if the synchronous signal is recorded into the recording medium, this synchronous signal may be firstly read to control the open interval of the optical shutter 13a on the basis of this synchronous signal.

Incidentally, similarly to the signal light 2, the reference light 3 may be converted by a beam expander into the light beam having a predetermined diameter. Furthermore, the optical shutter 13b disposed in the reference light optical system may be opened during the recording, or may be closed/opened synchronously with the optical shutter 13a. Furthermore, a liquid crystal device or the like may be used as the optical shutters 13a and 13b.

On the other hand, in the reproducing operation, the laser 11a is continuously oscillated, and the optical shutter 13 is closed to prevent the signal light 2 from achieving the recording medium 1, while the reference light 3 is introduced onto the recording medium with an angle the same as the incident angle of the reference light 3 for the recording. The recording medium 1 is irradiated with the reference light 3, and the diffraction light 5 from the recording medium 1 forms an image on the image detector 20 via the inverse Fourier transform lens 19. The output from the image detector 20 results in the reproduction signal.

In this case, the optical shutter 13b is controlled to open for a very short time with a timing of reproduction. In the case that the recording medium moves relative to the reference light, the image generated on the image detector 20 also moves. Even in this situation, the data showing good S/N ratio can be reproduced by shortening the reference light irradiation time.

In order to obtain the sufficient energy for the irradiation in the reproduction, the optical shutter 13b should be opened for a certain time. In this case, the reproduction image may be flowed on the image detector 20. However, the influence of the flow of the reproduction image can be eliminated by performing the signal processing, such as storing the reproduced image information into the buffer memory by using the detector having a large number of pixels.

Now, an explanation will be made with reference to drawings.

Figure 13:
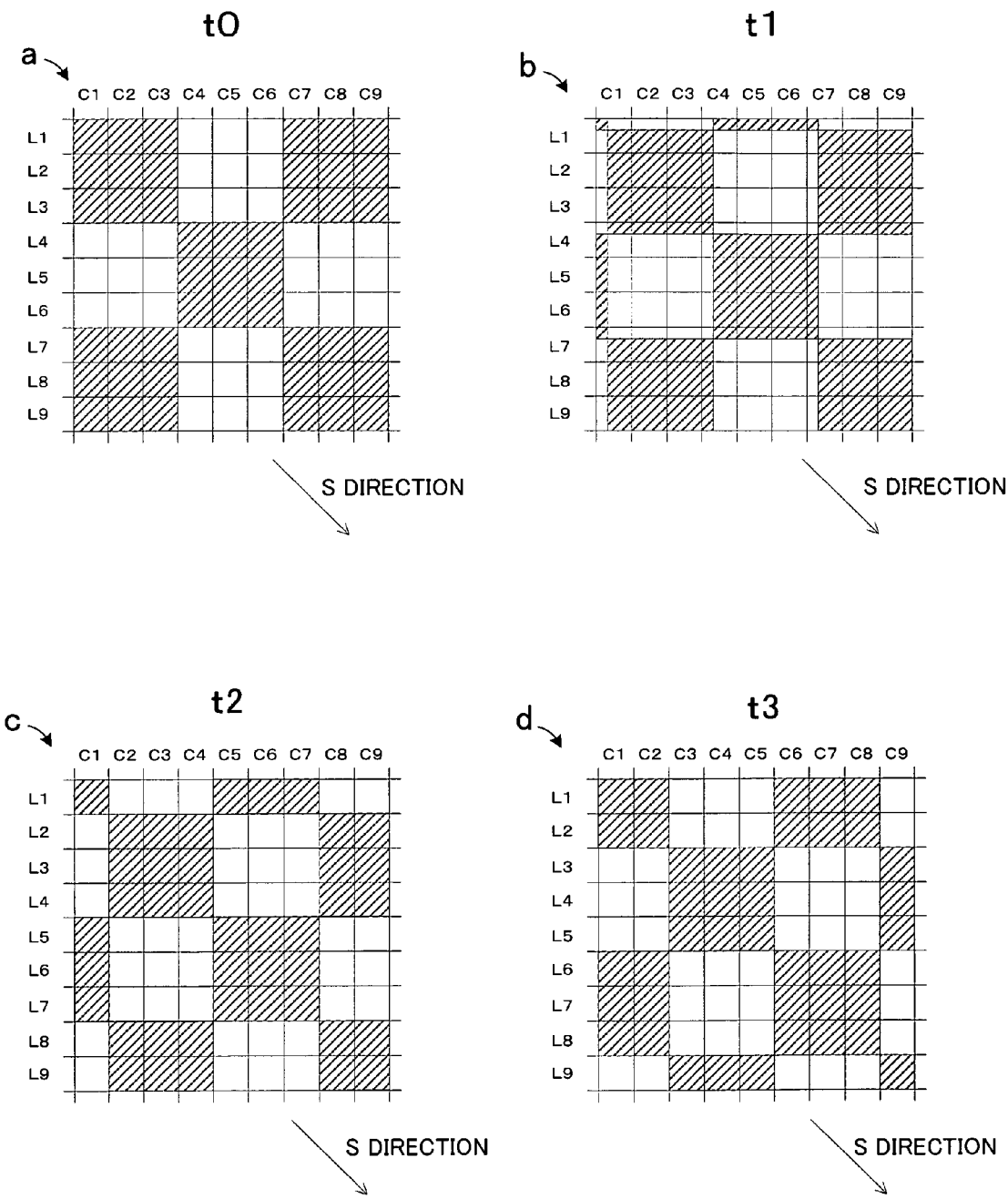
FIG. 13 illustrates a processing method of a reproduction image according to the present invention.

FIG. 13 shows an example of a reproduction image of a checker matrix flowing in S direction on the image detector, in the case that the ratio of the image detector pixels to the spatial modulator pixels is 9:1 (9×9 pixels on the image detector are drawn, in which rows are referred to as "L1 to L9", and columns are referred to as "C1 to C9" for the sake of convenience).

A symbol "a" in FIG. 13 indicates the reproduction image on the image detector at time t0. A symbol "b" in FIG. 13 indicates the reproduction image on the image detector at time t1 slightly after time t0. A symbol "c" in FIG. 13 indicates the reproduction image on the image detector at time t2 a certain time passed from time t0. A symbol "d" in FIG. 13 indicates the reproduction image on the image detector at time t3 a certain time passed from time t2.

In FIG. 13, the reproduction image "a" of the checker matrix matches image detector pixels perfectly. However, the reproduction image "b" flows in S direction, and the reproduction images "c" and "d" further flow in S direction. Viewing carefully image detector pixels in the reproduction images "a", "b" and "c" in FIG. 13, four pixels (L2, C2), (L2, C3), (L3, C2) and (L3, C3) are all black, while four pixels (L2, C5), (L2, C6), (L3, C5) and (L3, C6) are all white. Also in other portions on the matrix, these four pixels (referred to as area A) are not influenced by the movement of the reproduction image. Similarly, viewing carefully image detector pixels in the reproduction images "c" and "d", four pixels (L3, C3), (L3, C4), (L4, C3) and (L4, C4) are all black, while four pixels (L3, C6), (L3, C7), (L4, C6) and (L4, C7) are all white. Also in other portions on the matrix, these four pixels (referred to as area B) are not influenced by the movement of the reproduction image.

Therefore, if the reproduction time is in a range from time t0 to t2, information relating to data only of four pixels in the area A is used. If the reproduction time is long and reaches t3 exceeding t2, the process is switched into another process, in such a way that information relating to data only of four pixels in the area B is used. Similarly, if the reproduction time is further long, the process is switched into still another process. By switching the process, a good reproduction image can be obtained.

In the example of FIG. 13, the reproduction image moving diagonally to pixels is shown, nevertheless these processes can be applied to every direction of the movement of the reproduction image. Furthermore, the ratio 9:1 is exemplified as a ratio of image detector pixels to spatial modulator pixels, nevertheless these processes can be applied to other types of detection which is carried out by assigning plural pixels of an image detector to one pixel of the spatial modulator.

In order to determine automatically whether or not area is switched, the output of the image detector may be temporarily stored in the buffer memory for determining the switching timing.

Furthermore, the open time of the optical shutter 13b may be determined in the same manner as the control of the pulse width of the aforementioned reproduction apparatus. Further in the case that the synchronous signal is recorded in the recording medium, this synchronous signal may be firstly read to control the open interval of the optical shutter 13a on the basis of this synchronous signal.

In order to control the aforementioned recording operation and the reproduction operation, the system control unit 21 has a main CPU for controlling the entire operation of the recording apparatus 104. The laser driver 22 controls the continuous oscillation of the laser 11, under the system control unit 21, and the system controller 23 controls the optical shutters 13, 13a, 13b, the spatial modulator 15 and so on.

The recording medium drive mechanism 24 produces a movement of the recording medium 1 relative to the signal light 2 and the reference light 3. For example, the mechanism 24 may by a mechanism for rotating the recording medium 1 on a plane perpendicular to the light axis of the signal light 2, or a mechanism for straightly moving the recording medium 1 in X-Y direction. Alternatively, the signal light 2 and the reference light 3 may be moved relative to the recording medium 1.

The modulator driver 25 is for inputting the recording data into the spatial modulator 15 and driving the spatial modulator 15. The data input/output unit 26c is for inputting the recording data and outputting the reproduced data. The data processing unit 27 is for converting the recording data on the basis of the record format, adding for the signal processing to the recording data or performing the error correction on the recording data, and performing the error correction and encoding of the reproduced data. The detector controller 28 controls the operation of the image detector 20 and reads the two-dimensional image information corresponding to the record data generated on the image detector 20.

Alternatively, the record system and the reproduction system of the recording reproduction apparatus 104 may be separately constructed as the recording apparatus and the reproduction apparatus, respectively. This recording apparatus is different from the recording apparatus 101. In the former, the irradiating times of the signal light and the reference light are controlled by controlling the passing time of the light beam of the continuous oscillation laser with the optical shutter. In contrast to this, in the later, the irradiating times of the signal light and the reference light are controlled by the pulse width of the pulse oscillation. Furthermore, this reproduction apparatus is different from the recording apparatus 102. In the former, the irradiating times of the reference light are controlled by controlling the passing time of the light beam of the continuous oscillation laser with the optical shutter. In contrast to this, in the later, the irradiating times of the reference light are controlled by the pulse width of the pulse oscillation.

As explained above, even in the case that the continuous oscillation laser is used, and the recording medium moves relative to the signal light and the reference light, the interference fringes can be generated in the recording medium from the two-dimensional image data corresponding to the recording data and the reference light, with a large intensity amplitude, and the data showing good S/N ratio can be reproduced.

The present invention is not limited to the aforementioned embodiments, but can be modified or changed within a rage without departing from the spirit or essence of the present invention read from the whole specification and the claims. The recording apparatus, the reproduction apparatus and the recording reproduction apparatus involving such a modification or change are also encompassed within a scope of the invention.

INDUSTRIAL APPLICABILITY

The recording apparatus, the reproduction apparatus and the recording reproduction apparatus according to the present invention are applicable to a hologram recording apparatus, a hologram reproduction apparatus and a hologram recording reproduction apparatus for recording a great volume of data into a hologram recording medium or reproducing the data from the hologram recording medium.

The invention claimed is:

1. A recording apparatus for recording a light interference pattern of at least two coherent lights into a recording medium as a spatial change of a refractive index, the apparatus comprising:
   a pulse oscillation laser for generating coherent light;
   a signal light optical system for introducing coherent signal light based on the coherent light to the recording medium via a Fourier Transform lens;
   a reference light optical system for introducing coherent reference light based on the coherent light to the recording medium;
   a spatially modulating device disposed in the signal light optical system; and
   a pulse oscillation controlling device for controlling an oscillation timing of the laser and pulse width of the laser,
   wherein the pulse width is determined in accordance with a ratio between a pitch of the light interference pattern to be recorded and a moving speed of the recording medium relative to the signal light and the reference light.

2. The recording apparatus according to claim 1, further comprising:
   a moving device for changing a position of the recording medium relative to positions of the signal light and the reference light.

3. The recording apparatus according to claim 1, wherein the spatially modulating device is one of a phase modulating device and an amplitude modulating device.

4. A recording apparatus for recording a light interference pattern of at least two coherent lights into a recording medium as a spatial change of a refractive index, the apparatus comprising:
   a continuous oscillation laser for generating coherent light;
   a signal light optical system for introducing coherent signal light based on the coherent light to the recording medium via a Fourier Transform lens;
   a reference light optical system for introducing coherent reference light based on the coherent light to the recording medium;
   a spatially modulating device disposed in the signal light optical system;
   an optical shutting device disposed in the signal light optical system for selectively passing or obstructing the signal light; and
   an optical shutter controlling device for controlling an open time and an open timing of the optical shutting device,
   wherein the open time is adjusted in accordance with a ratio between a pitch of the light interference pattern to be recorded and a moving speed of the recording medium relative to the signal light and the reference light.

5. The recording apparatus according to claim 4, further comprising:
   a moving device for changing a position of the recording medium relative to positions of the signal light and the reference light.

6. The recording apparatus according to claim 4, wherein the spatially modulating device is one of a phase modulating device and an amplitude modulating device.

7. The recording apparatus according to claim 4, wherein the optical shutting device is one of a phase modulating device and an amplitude modulating device.

8. A reproduction apparatus for reproducing information on the basis of a light interference pattern of at least two coherent lights recorded in the recording medium as a spatial change of a refractive index, the apparatus comprising:
   a pulse oscillation laser for generating coherent light;
   a reference light optical system for introducing coherent reference light based on the coherent light to the recording medium;
   a photodetecting device for receiving diffraction light based on the reference light from the recording medium via an inverse Fourier Transform lens; and
   a pulse oscillation controlling device for controlling an oscillation timing of the laser and pulse width of the laser,
   wherein the pulse width is determined in accordance with a ratio between a pitch of the recorded light interference pattern and a moving speed of the recording medium relative to the signal light and the reference light.

9. The reproduction apparatus according to claim 8, further comprising:
   a moving device for changing a position of the recording medium relative to a position of the reference light.

10. The reproduction apparatus according to claim 8, wherein the photodetecting device is a CCD device.

11. The reproduction apparatus according to claim 8, wherein the photodetecting device is a CMOS device.

12. A recording reproduction apparatus for recording a light interference pattern of at least two coherent lights into a recording medium as a spatial change of a refractive index and reproducing the recorded pattern, the apparatus comprising:
   a pulse oscillation laser for generating coherent light;
   a signal light optical system for introducing coherent signal light based on the coherent light to the recording medium via a Fourier Transform lens;
   a reference light optical system for introducing coherent reference light based on the coherent light to the recording medium;

a spatially modulating device disposed in the signal light optical system;
a photodetecting device for receiving diffraction light based on the reference light from the recording medium via an inverse Fourier Transform lens; and
a pulse oscillation controlling device for controlling an oscillation timing of the laser and pulse width of the laser,
wherein the pulse width for recording is determined in accordance with a ratio between a pitch of the light interference pattern to be recorded and a moving speed of the recording medium relative to the signal light and the reference light.

13. The recording reproduction apparatus according to claim 12, further comprising:
a moving device for changing a position of the recording medium relative to positions of the signal light and the reference light.

14. The recording reproduction apparatus according to claim 12, wherein
the spatially modulating device is one of a phase modulating device and an amplitude modulating device.

15. The recording reproduction apparatus according to claim 12, wherein
the photodetecting device is a CCD device.

16. The recording reproduction apparatus according to claim 12, wherein
the photodetecting device is a CMOS device.

17. A recording reproduction apparatus for recording a light interference pattern of at least two coherent lights into a recording medium as a spatial change of a refractive index and reproducing the recorded pattern, the apparatus comprising:
a continuous oscillation laser for generating coherent light;
a signal light optical system for introducing coherent signal light based on the coherent light to the recording medium via a Fourier Transform lens;
a reference light optical system for introducing coherent reference light based on the coherent light to the recording medium;
a spatially modulating device disposed in the signal light optical system;
a first optical shutting device disposed in the signal light optical system for selectively passing or obstructing the signal light;
a second optical shutting device disposed in the reference light optical system for selectively passing or obstructing the reference light;
an optical shutter controlling device for controlling an open time and an open timing of the first optical shutting device and the second optical shutting device; and
a photodetecting device for receiving diffraction light based on the reference light from the recording medium via an inverse Fourier Transform lens,
wherein an area of the photodetecting device is selected in accordance with the open time of the optical shutting device, and
wherein the open time of the first optical shutting device for recording is adjusted in accordance with a ratio between a pitch of the light interference pattern to be recorded and a moving speed of the recording medium relative to the signal light and the reference light.

18. The recording reproduction apparatus according to claim 17, further comprising:
a moving device for changing a position of the recording medium relative to positions of the signal light and the reference light.

19. The recording reproduction apparatus according to claim 17, wherein
the spatially modulating device is one of a phase modulating device and an amplitude modulating device.

20. The recording reproduction apparatus according to claim 17, wherein
each of the first optical shutting device and the second optical shutting device is one of a phase modulating device and an amplitude modulating device.

21. The recording reproduction apparatus according to claim 17, wherein
the photodetecting device is a CCD device.

22. The recording reproduction apparatus according to claim 17, wherein
the photodetecting device is a CMOS device.

23. A recording/reproducing apparatus for recording a light interference pattern of at least two coherent lights into a recording medium as a spatial change of a refractive index and reproducing the recorded pattern, the apparatus comprising:
a continuous oscillation laser for generating coherent light;
a signal light optical path for introducing coherent signal light based on the coherent light to the recording medium, the signal light optical path including a first optical shutter, a second optical shutter downstream of the first optical shutter, a spatial modulator downstream of the second optical shutter and a Fourier Transform lens downstream of the spatial modulator;
a reference light optical path for introducing coherent reference light based on the coherent light to the recording medium, the reference light optical path including a third optical shutter;
an optical shutter controlling device for controlling open times and open timings of the first, second and third optical shutters, wherein the open time and open timing of at least the second optical shutter is adjusted for recording in accordance with a ratio between a pitch of the light interference pattern to be recorded and a moving speed of the recording medium relative to the signal light and the reference light; and
a photodetecting device for receiving diffraction light based on the reference light from the recording medium via an inverse Fourier Transform lens.

24. A recording apparatus for recording a light interference pattern of at least two coherent lights into a recording medium as a spatial change of a refractive index, the apparatus comprising:
a pulse oscillation laser for generating coherent light;
a signal light optical path for introducing coherent signal light based on the coherent light to the recording medium, the signal light optical path including a spatial modulator and a Fourier Transform lens;
a reference light optical path for introducing coherent reference light based on the coherent light to the recording medium; and
a pulse oscillation controlling device for controlling an oscillation timing of the laser and pulse width of the laser,
wherein the pulse width of the laser is less than or equal to $(0.78 \times K)/V$ sec, where $K$ is a pitch of the light interference pattern to be recorded and $V$ is a moving speed of the recording medium relative to the signal light and the reference light.

* * * * *